US 6,665,090 B1

(12) United States Patent
Hall et al.

(10) Patent No.: US 6,665,090 B1
(45) Date of Patent: Dec. 16, 2003

(54) SYSTEM AND METHOD FOR CREATING AND PRINTING A CREATIVE EXPRESSION

(75) Inventors: David M. Hall, Vancouver, WA (US); Jeff M. Anderson, Vancouver, WA (US); Michael D. Whitmarsh, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/524,669

(22) Filed: Mar. 13, 2000

(51) Int. Cl.⁷ .............................................. G06K 15/00
(52) U.S. Cl. ..................... 358/1.18; 358/1.15
(58) Field of Search ..................... 358/1.1, 1.2, 1.11, 358/1.13, 1.15, 1.16, 1.17, 1.18, 540, 538; 715/515, 516, 520; 382/209, 284

(56) References Cited

U.S. PATENT DOCUMENTS 6,317,783 B1 * 11/2001 Freishtat et al. ............ 709/218
6,601,100 B2 * 7/2003 Lee et al. .................. 709/226

* cited by examiner

Primary Examiner—Arthur G. Evans

(57) ABSTRACT

A system and method are provided for generating an expression definition file from which a creative expression may be printed. Briefly described, in one embodiment, the system includes a processing server having a processor electrically coupled to a local interface and a memory electrically coupled to the local interface. The processing server is configured to communicate with an affiliate server via a communications network. The system further comprises operating logic stored on the memory and executable by the processor. The operating logic includes logic to receive a logical creative expression that defines the creative expression from the affiliate server. The logical creative expression has one or more content elements and a template type. The operating logic further includes logic to identify a template stored in the memory that is associated with the template type, the template specifying one or more pages with associated regions, and logic to associate the content elements with the regions. Finally, the operating logic includes logic to generate the expression definition file embodying the creative expression, the expression definition file specifying the pages with their associated regions for printing.

35 Claims, 20 Drawing Sheets

Printable Expressions

First, choose a type of expression to print.

Expression Categories:

| Birthdays | Events | Thoughts | Holidays |
|---|---|---|---|
| Belated | Anniversary | Congratulations | Hanukkah |
| Female | Baby | Encouragement | Christmas |
| Humor | Engagement | Good Bye | Kwanzaa |
| Kids | New Home | Get Well | New Year |
| Love | New Job | I'm Sorry | Valentines |
| Male | Retirement | Keep in Touch | |
| Office | Sympathy | Love | ←213 |
| Relative | Wedding | Thank You | |

Printable Expressions picture   greeting

① ② ③ ④ ⑤ ⑥ ⑦ ⑧   40 Pictures   216

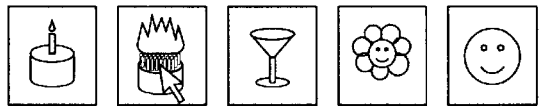

FIG. 2D

Expression Definition File

```xml
<?xml version="1.0" encoding="UTF-8"?>
<hpipcdocument version="2">
<prepo duplex="false" showprintdialog="true">

<image x="335.89987" y="409.04144" height="367.14505" width="272.21027" rotangle="90.0"
 rotunits="COUNTERCLOCKWISE_DEGREES" rotabout="CENTER">
<file access="HTTP" name="file://c|/windows/TEMP/hpprtemp.jpg?hpcomp=no" dir="" separator="/" mode="FILL" />
</image>
<image x="25.724804" y="3.9620132" height="341.74405" width="246.90036" rotangle="270.0"
 rotunits="COUNTERCLOCKWISE_DEGREES" rotabout="CENTER">
<file access="HTTP" name="http://hpice/expview/tmp/CPETxtPrnt39708964.jpg?hpcomp=no" dir="" separator="/" mode="FILL" />
</image>
<image x="63.689613" y="564.12146" height="56.985176" width="57.01178" rotangle="270.0"
 rotunits="COUNTERCLOCKWISE_DEGREES" rotabout="CENTER">
<file access="HTTP" name="http://hpice/expview/print/template/pelogo.jpg?hpcomp=no" dir="" separator="/" mode="FILL" />
</image>
<image x="25.724804" y="478.64362" height="227.94077" width="37.96481" rotangle="0.0"
 rotunits="COUNTERCLOCKWISE_DEGREES" rotabout="CENTER">
<file access="HTTP" name="http://hpice/expview/print/template/petxr270.jpg?hpcomp=no" dir="" separator="/" mode="FILL" />
</image>

</prepo>
</hpipcdocument>
```

FIG. 4J

Sample Jobspec File

```xml
<?xml version="1.0"?>
<!DOCTYPE PRINTJOB SYSTEM "http://hpprintit.com/hpipb/print_it.dtd">
<PRINTJOB VERSION="1.0" AFFILIATE="FunCards"
      REPLY_TO="joe_coder@1FunCards.com">
  <TEMPLATE_NAME>FUNQF</TEMPLATE_NAME>
  <DATE_TIME_CREATED>
    <YEAR>2000</YEAR>
    <MONTH>01</MONTH>
    <DAY>06</DAY>
    <HOUR>15</HOUR>
    <MINUTE>36</MINUTE>
  </DATE_TIME_CREATED>
  <PRINT_OPTIONS SHOW_CLIENT_PRINT_DIALOG="yes" SHOW_LOAD="no">
  </PRINT_OPTIONS>
  <CONTENT>
    <TEXT>
      <REGION>Text1</REGION>
      <TEXT_STRING>Dear Jess</TEXT_STRING>
      <FONT TYPEFACE="swiss" SIZE="10" COLOR="blue"></FONT>
    </TEXT>
    <TEXT>
      <REGION>Text2</REGION>
      <TEXT_STRING>Hope you are having a great day.</TEXT_STRING>
      <FONT TYPEFACE="swiss" SIZE="10" COLOR="blue"></FONT>
    </TEXT>
    <TEXT>
      <REGION>Text3</REGION>
      <TEXT_STRING>Your friend, Austin</TEXT_STRING>
      <FONT TYPEFACE="swiss" SIZE="10" COLOR="blue"></FONT>
    </TEXT>
    <IMAGE>
      <REGION>FunLogo</REGION>
      <REMOTE>http://funcards.com/template/funlogo.gif</REMOTE>
    </IMAGE>
    <IMAGE>
      <REGION>Image1</REGION>
      <REMOTE>http://funcards.com/template/banner.jpg</REMOTE>
    </IMAGE>
    <IMAGE>
      <REGION>Image2</REGION>
      <REMOTE>http://funcards.com/template/holiday.jpg</REMOTE>
    </IMAGE>
  </CONTENT>
</PRINTJOB>
```

FIG. 4L

SYSTEM AND METHOD FOR CREATING AND PRINTING A CREATIVE EXPRESSION

CROSS-REFERENCE TO RELATED APPLICATIONS

This application is related to co-pending United States patent application entitled "System and Method for Printing a Creative Expression" filed on even date herewith and accorded Ser. No. 09/524,194, and to co-pending United States patent application entitled "System and Method to Configure a Creative Expression" filed on even date herewith and accorded Ser. No. 09/524,193, both of which are entirely incorporated herein by reference.

TECHNICAL FIELD

The present invention is generally related to the field of printing and, more particularly, is related to a system and method for creating and printing a creative expression.

BACKGROUND OF THE INVENTION

The Internet, which started in the late 1960s, is a vast computer network consisting of many smaller networks that span the entire globe. The Internet has grown exponentially, and millions of users ranging from individuals to corporations now use permanent and dial-up connections to use the Internet on a daily basis worldwide. The computers or networks of computers connected within the Internet, known as "hosts", allow public access to databases featuring information in nearly every field of expertise and are supported by entities ranging from universities and government to many commercial organizations.

The information on the Internet is made available to the public through "servers". A server makes available files or documents that it contains to the public. An Internet server may distribute information to any computer that requests the files. The computer making such a request is known as the "client", which may be an Internet-connected workstation, bulletin board system or home personal computer (PC), etc.

TCP/IP (Transmission Control Protocol/Internet Protocol) is one networking protocol that permits full use of the Internet. All computers on a TCP/IP network include unique ID codes. Therefore, each computer on the Internet is identified by a unique number code, known as the IP (Internet Protocol) number or address, and corresponding network and computer names. In the past, an Internet user gained access to its resources only by identifying the host computer and a path through directories within the host's storage to locate a requested file.

The World Wide Web (Web) is a method of accessing information on the Internet that allows a user to navigate the Internet resources intuitively, without IP addresses or other technical knowledge. The Web dispenses with command-line utilities that typically require a user to transmit sets of commands to communicate with an Internet server. Instead, the Web is made up of billions of interconnected "pages", or documents, which can be displayed on a computer monitor. The Web pages are provided by special Web servers. Software that runs these Web servers is relatively simple and is available on a wide range of computer platforms including PC's. Equally available is a form of client software, known as a Web "browser", that is used to display Web pages as well as traditional non-Web files on the client system. Today, Web servers are increasing at a rate of thousands per month and have fast become the preferred method of Internet communication.

Created in 1991, the Web is based on the concept of "hypertext" and a transfer method known as "HTTP" (Hypertext Transfer Protocol). HTTP is designed to run primarily over TCP/IP and uses the standard Internet setup, where a server issues the data and a client displays or processes it. One format for information transfer is to create documents using Hypertext Markup Language (HTML). HTML pages are made up of standard text as well as formatting codes that indicate how the page should be displayed. The Web client, a browser, reads these codes in order to display the page.

Each Web page may contain pictures and sounds in addition to text. Hidden behind certain text, pictures or sounds are connections, known as "hypertext links" ("links"), to other pages within the same server or even on other computers within the Internet. For example, links may be visually displayed as words or phrases that may be underlined or displayed in a second color. Each link is directed to a web page by using a special name called a URL (Uniform Resource Locator). URLs enable a Web browser to go directly to any file held on any Web server. A user may also specify a known URL by writing it directly into the command line on a Web page to jump to another Web page.

The Web has become a very successful means of communication between central sites connected to the Internet and individual users on the Internet who wish to communicate with the site. The communications are controlled by two programs, a Web Browser that runs on the user's computer and a Web server that runs on the site's computer. A Web Browser sends a request to a Web Server using the HTTP protocol. A request results in a MIME ("Multipurpose Internet Mail Extensions"—see IETF RFC 1341, 1342, 1521) stream being sent back to the Web Browser. The MIME stream includes a Content Type header for the data that indicates how the Web Browser will treat the data being sent. For example, a "text/html" MIME type indicates that the data is in the hypertext markup language (HTML), and should be interpreted accordingly; an "image/gif" MIME type indicates that the data is a "gif" image file, and should be rendered as an image after unpacking the data in the file.

The Web server typically services a request either by sending back a file stored locally on the server or by running a program, the output of which is the MIME stream to be sent back to the browser. As noted above, the Web typically makes use of the hypertext format to display information to a user and receive input from the user. Hypertext allows a body of information to be organized into a hierarchical system in which the user can pursue increasing levels of specificity by following the various hypertext links from one document to the next.

A typical Web Browser or hypertext text display system displays a document in which selected words or phrases are highlighted. The highlighted phrase indicates that another document related to that phrase is in the system. If the person viewing the document selects one of these words or phrases by pointing and clicking using a pointing device, the second document related to that word or phrase is sent to the user's screen. The user may return to the original document at any time selecting a "back" option on the viewer screen.

This form of information display has found wide acceptance on the Internet because of its ease of use. A user located at a terminal on the network connects to a server on the network that has a "home page" in hypertext format. The home page is then displayed on the client by the browser. When the user selects a highlighted word, the browser communicates the user's choice to the server in a MIME data stream. The server then transfers the corresponding file to the client via the network. The browser on the client then displays this file to the user. Conventional browsers also allow the user to input text that is then transferred to the server when the user selects a graphical element such as a button, etc. Hence, the user can communicate information to the server beyond the predefined hypertext link information, provided the server is programmed to use this information.

Concurrent with the development of the Internet, printing technology has also advanced. Current printing technology allows the average user to print rather detailed images and texts of various fonts in black and white as well as in color. For example, ink jet printers provide significant capability to users to print detailed images in full color. An end user may download an HTML document from a server on the World Wide Web and then print the HTML document on a printer on the client device to obtain a hardcopy of the images and text contained therein.

However, the printing of HTML documents or other similar documents from a browser often provides limited flexibility with regard to the format of these documents, etc. In particular, HTML documents provide limited ability to print specialized creative expressions that include the image and text content contained therein in specialized formats. Often, to access the images and text content contained within an HTML document for a specific use such as creating a greeting card or poster, etc., an editing program is employed to manipulate the images and text in a desired manner. Unfortunately, editing programs are generally complicated and their use is often beyond the ability of the average user.

SUMMARY OF THE INVENTION

In light of the foregoing, the present invention provides a system and method for generating an expression definition file from which a creative expression may be printed. Briefly described, in one embodiment, the system includes a processing server having a processor electrically coupled to a local interface and a memory electrically coupled to the local interface. The processing server is configured to communicate with an affiliate server via a communications network.

The system further comprises operating logic stored on the memory and executable by the processor. The operating logic includes logic to receive a logical creative expression that defines the creative expression from the affiliate server. The logical creative expression has one or more content elements and a template type. The operating logic further includes logic to identify a template stored in the memory that is associated with the template type, the template specifying one or more pages with associated regions, and logic to associate the content elements with the regions. Finally, the operating logic includes logic to generate the expression definition file embodying the creative expression, the expression definition file specifying the pages with their associated regions for printing.

The present invention can also be viewed as providing a method for generating an expression definition file from which a creative expression may be printed. In this regard, the method can be broadly summarized by the following steps: receiving a logical creative expression in a processing server from an affiliate server, the logical creative expression having at least one content element and a template type; identifying a template associated with the template type within the processing server, the template specifying at least one page with at least one region; associating the at least one content element with the at least one region; and, generating the expression definition file embodying the creative expression, the expression definition file specifying the at least one page with the at least one region and the at least one content element associated therewith for printing.

In another embodiment, the present invention comprises another system for generating an expression definition file from which a creative expression may be printed. According to this embodiment, the system includes a processing server having a processor electrically coupled to a local interface and a memory electrically coupled to the local interface, the processing server being configured to communicate with a client device via a communications network. The system also includes operating logic stored on the memory and executable by the processor. The operating logic comprises logic to generate a logical creative expression based upon a selection input received from the client device via the communications network, the logical creative expression having a template type and at least one content element. The operating logic further includes logic to identify a template associated with the template type, the template specifying one or more pages, each page having one or more regions associated therewith. The operating logic also includes logic to associate the content element with the one of the regions. Finally, the operating logic includes logic to generate the expression definition file embodying the creative expression, the expression definition file specifying the pages with the regions contained therein for printing.

In addition, the present invention may be viewed as providing another method for generating an expression definition file from which a creative expression may be printed. In this regard, the method can be broadly summarized by the following steps: generating a logical creative expression in a processing server based upon a selection input received from a client device via a communications network, the logical creative expression having a template type and at least one content element; identifying a template associated with the template type, the template specifying at least one page with at least one region; associating the content element with the region; and generating the expression definition file embodying the creative expression, the expression definition file specifying the page with the region for printing.

The present invention provides distinct advantages, one of which is to allow a user to print out a creative expression in a desired form such as a greeting card or poster, etc., without requiring significant or complicated input from the end user.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 2A–2G are drawings of graphical user interfaces employed in a client device of the creative expression system of FIG. 1;

FIG. 4J is a drawing of an expression definition file generated by the build logic of FIG. 4;

FIG. 4L is a drawing of a jobspec file processed by the build logic of FIG. 4;

DETAILED DESCRIPTION OF THE INVENTION

Figure 1:
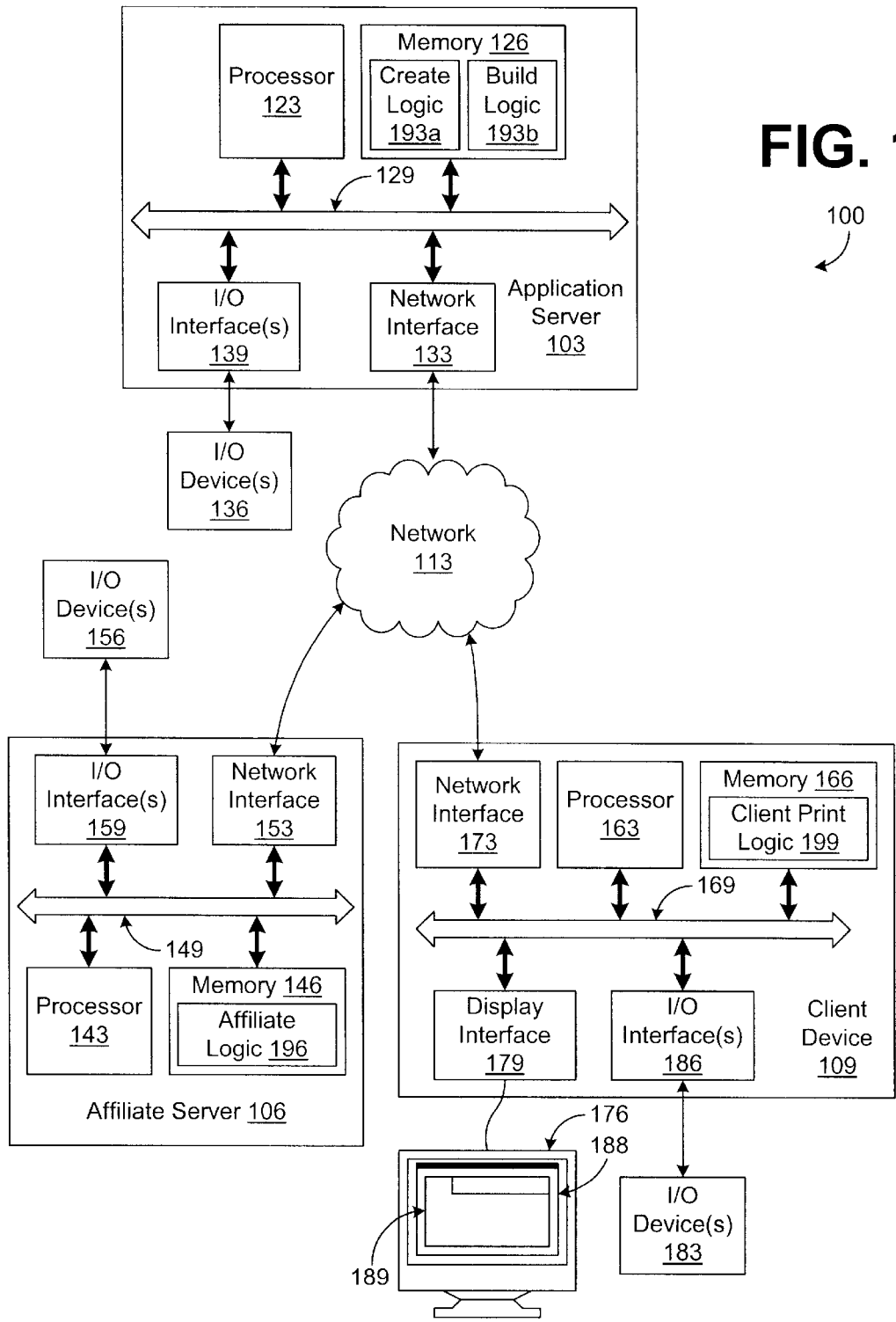
FIG. 1 is a block diagram of a creative expression system according to an embodiment of the present invention.

With reference to FIG. 1, shown is a creative expression system according to an embodiment of the present invention. The creative expression system 100 includes an application server 103, an affiliate server 106, and a client device 109 that are each interlinked by way of a network 113. In a preferred embodiment, the application server 103 comprises a processor 123 and a memory 126, both of which are electrically coupled to a local interface 129. The application server 103 is electrically coupled to the network 113 by way of a network interface 133. The application server 103 also includes a number of input/output devices 136 that are each electrically coupled to the local interface 129 through a number of input/output interfaces 139 as shown.

Likewise, the affiliate server 106 preferably includes a processor 143 and a memory 146, both of which are electrically coupled to a local interface 149. The affiliate server 106 is also linked to the network 113 by way of a network interface 153. The affiliate server 106 also includes a number of input/output devices 156 each of which is electrically coupled to the local interface 149 by way of one or more input/output interfaces 159.

The creative expression system 100 also includes a client device 109 that preferably features a processor 163 and a memory 166 both of which are electrically coupled to a local interface 169. The client device 109 is also linked to the network 113 by way of a network interface 173 as shown. The client device 109 also includes a display device 176 that is electrically coupled to the local interface 169 via a display interface 179. The client device 109 may also feature a number of input/output devices 183 that are electrically coupled to the local interface 169 by way of the input/output interfaces 186. Note that the display device 176 actually falls within the realm of the input/output devices 183, however, it is shown separately for purposes of providing greater clarity in describing the present invention. In particular, displayed on the display device 176 is a browser 188 that, in turn, displays a graphical user interface 189 according to an embodiment of the present invention.

The application server 103 also includes create logic 193a and build logic 193b that are stored on the memory 126 and are executable by the processor 123 to perform the various functions of the application server 103 itself. Likewise, the affiliate server 106 also includes affiliate logic 196 that is stored on the memory 146 and is executable by the processor 143 in performing the various functions of the affiliate server 106. Finally, the client device 109 includes client print logic 199 that is stored in the memory 166 and is executable by the processor 163. Also, the application server 103, affiliate server 106, and the client device 109 may also include a suitable operating system stored on their respective memories 126, 146, and 166 as is known in the art.

The input/output devices 136, 156, and 183 of the creative expressions system 100 may comprise any one of several input/output devices, such as, for example, display devices, speakers, printers, keyboards, a mouse, microphones, networks, and/or other such devices. The display device 176 and display devices included in the input/output devices 135 and 156 may comprise, for example, a cathode ray tube (CRT), a liquid crystal display screen, a gas plasma-based flat panel display, indicator lights, light emitting diodes, and other suitable display devices.

The memories 126, 153, and 166 may comprise both volatile and nonvolatile memory components. Volatile components are those that do not retain data values upon loss of power. Conversely, nonvolatile components retain data upon a loss of power. In this manner, memories 126, 153, and 166 may include, for example, random access memory (RAM), read-only memory (ROM), hard disk drives, floppy disk drives, compact disk drives, tape drives, and other memory components. Also, the local interfaces 129, 149, and 169 may each comprise a data bus and an accompanying control bus that is controlled by the processors 123, 143, 163, respectively. The network interfaces 133, 153, and 173 may comprise an appropriate network interface card that are known in the art or other similar such device to interface with an appropriate network 113 that may comprise, for example, the Internet, wide area networks, or any other such networks.

Finally, the browser 188 is also included on the memory 166 and executable by the processor 163. The browser 188 provides a graphical user interface that allows the user to access information via, for example, the World Wide Web. The World Wide Web is comprised of the total set of interlinked hypertext documents located on servers in the world. Documents on the World Wide Web are typically written in Hypertext Markup Language (HTML) and are identified by Uniform Resource Locators (URLs). The URLs generally specify the machine and pathname by which a document or file can be accessed, and transmitted to the end user under Hypertext Transfer Protocol (HTTP).

Next, the operation of the creative expression system 100 is explained. In one embodiment, the creative expression system 100 may operate according to two different schemes. According to the first scheme, the user manipulates the client device 109 to interface with the application server 103 to create a specific creative expression such as a card, poster, label, or other expression pursuant to the create logic 193a. Ultimately, the build logic 193b is employed to create the creative expression that is embodied in a data file for transmission from the application server 103 to the client device 109 where it is printed on a printer attached thereto pursuant to the client print logic 199.

According to the second scheme, the user manipulates the client device 109 to interface with the affiliate server 106 to create or choose a predefined creative expression. In this manner, the affiliate server 106 may include logic to create the creative expression in a similar manner as the application server 103, or the user may simply choose from a ready made selection of predefined creative expressions. After the creative expression is chosen, a "jobspec" file that defines the content of the creative expression is transmitted from the affiliate server 106 to the application server 103 for further processing. The jobspec file defines the content of the creative expression in a predefined format as will be discussed with reference to later figures. The application server 103 then processes the jobspec file and generates a data file that specifically includes both the content and the form of the creative expression. The processing function of the application server 103 is performed by the build logic 193b.

The data file may then be transmitted to the client device 109 for printing pursuant to the client print logic 199. Alternatively, the client print logic 199 may reside on the affiliate server 106 or other computer associated with the affiliate entity and the data file may be transmitted thereto for printing in a similar manner. In this alternative, for example, the affiliate server 106 may be employed to take orders from the client device 109 to facilitate an "on-line" purchase of goods. The user may select a creative expression as discussed above that ultimately is printed at a location associated with the affiliate and is shipped with the goods ordered.

Figure 2A:
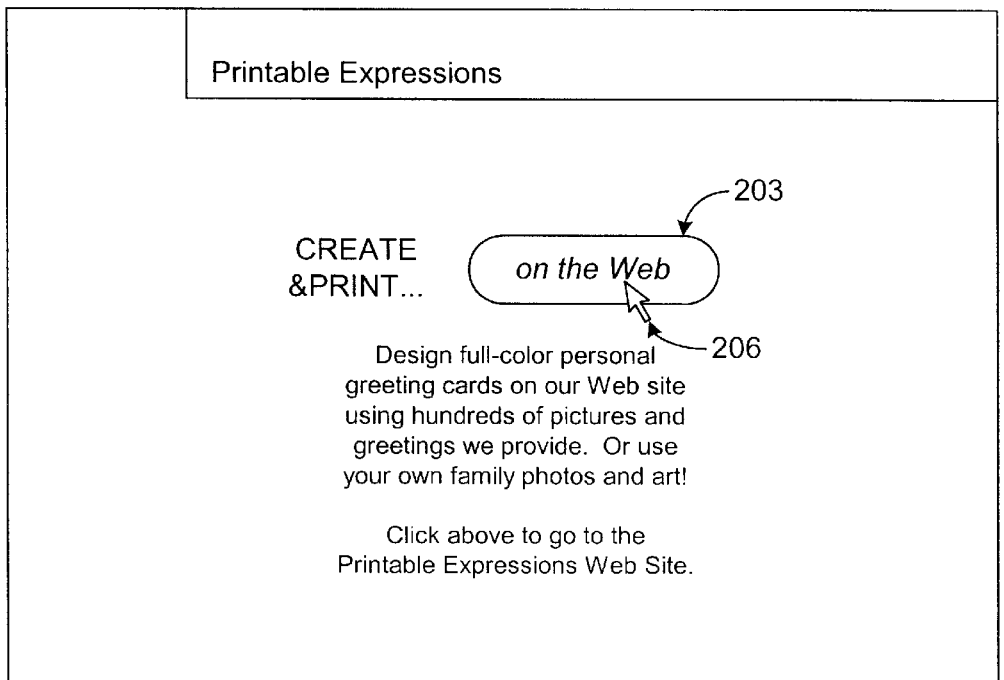

Turning then, to FIG. 2A, shown is a first graphical user interface 189a that is displayed on the display device 176 (FIG. 1) and is downloaded from either the applications server 103 or the affiliate server 106 depending on which of the aforementioned schemes is employed according to the present invention. The first graphical user interface 189a includes a button 203 that the user "clicks" on using the cursor 206 as manipulated by, for example, a mouse or other such device as known by those skilled in the art.

Figure 2B:
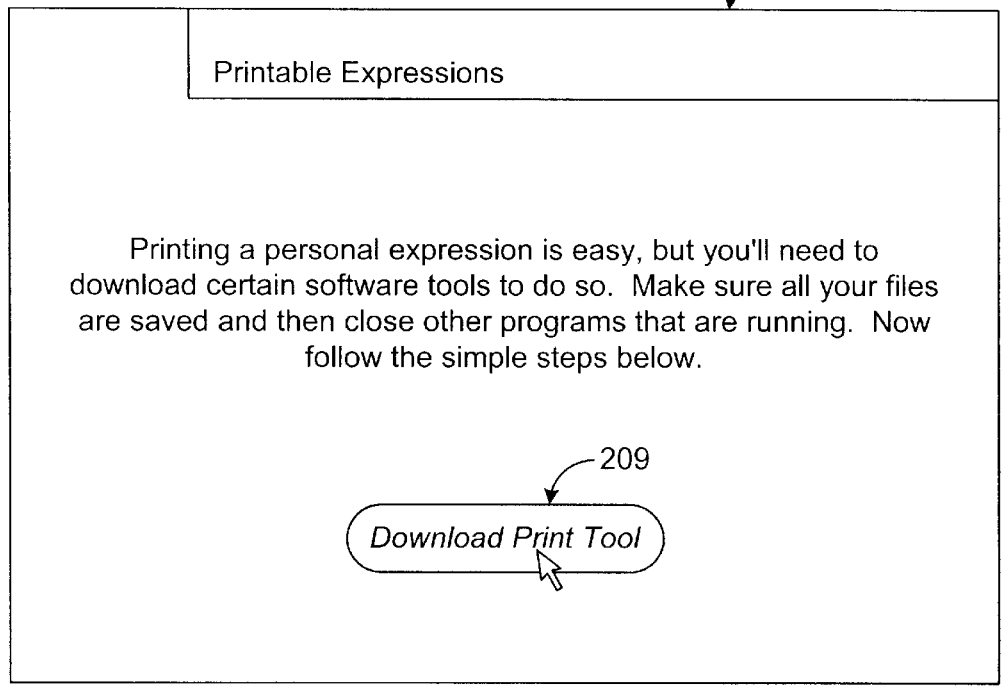

With reference to FIG. 2B, when the button 203 is depressed in FIG. 2A, the second graphical user interface 189b appears on the display device 176 (FIG. 1). The second graphical user interface 189 includes a download button 209. When a user clicks on the download button 209, the client print logic 199 is downloaded from the applications server 103 depending upon whether the client device 109 already includes the client print logic 199 to facilitate the transaction between the client device and the applications server 103. This allows the user to print a creative expression using the client device 109.

Turning then to FIG. 2C, shown is a third graphical user interface 189c that illustrates a number of expression category designations 213. Each of the expression category designations 213 has a number of logical creative expressions associated therewith. A logical creative expression is defined as a representation of the image and/or text content of a creative expression as well as a template that defines the physical form of the creative expression. A logical creative expression may comprise, for example, a greeting card, a poster, label, or other printed matter, etc. The various categories of the expression category designations 213 generally allude to the subject matter of the various logical creative expressions associated therewith. Turning then to FIG. 2D, shown is a fourth graphical user interface 189d that illustrates a number of logical creative expressions 216. The logical creative expressions 216 may comprise, for example, an image or a block of text, or both. As shown in the fourth graphical user interface 189d, the user may click on a particular image associated with the logical creative expressions 216 to select that particular logical creative expression 216.

Figure 2E:
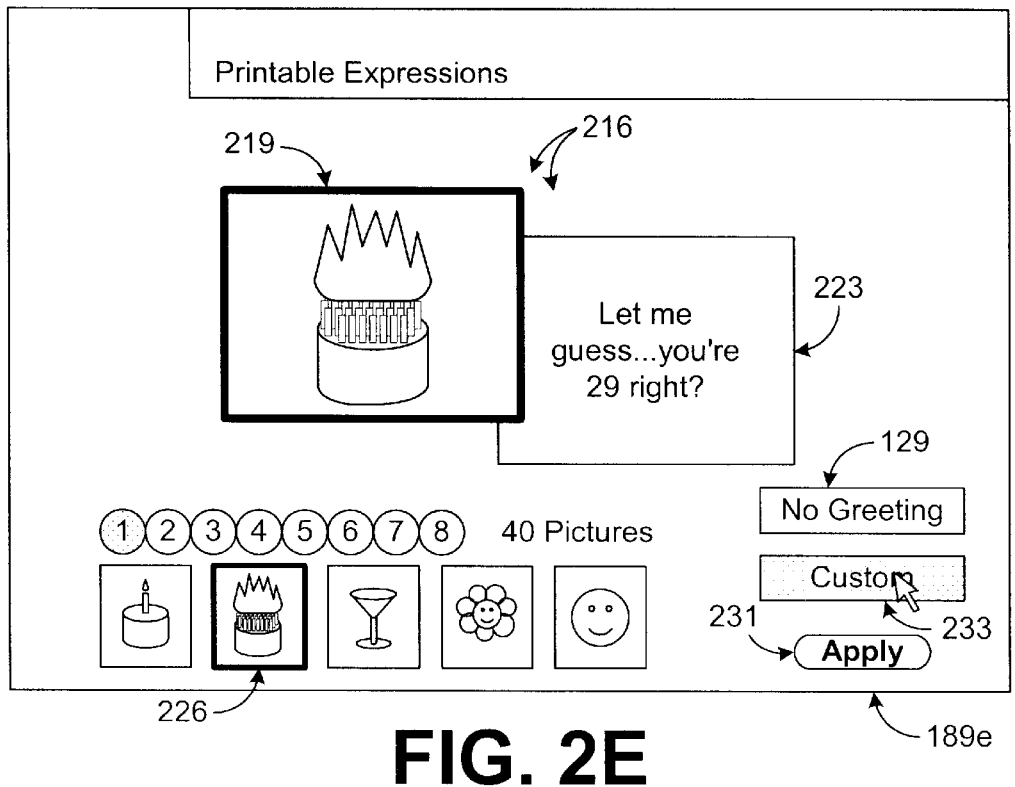

With reference to FIG. 2E, shown is a fifth graphical user interface 189e that illustrates the particular logical creative expression 216 that has been selected by the user. An image 219 is shown in a full view format along with a block of text 223. Note that the same image 219 is shown in terms of a thumbnail view 226 that the user may click upon to select the particular logical creative expression 216. The fifth graphical user interface 189e also includes a "no greeting" button 229 in the case the logical creative expression is a greeting card that may be pressed if it is desired that there be no greeting along with the particular logical creative expression 216.

The fifth graphical user interface also includes a custom button 233 that is depressed when the user wishes to enter their own greeting along with the particular logical creative expression 216 that is created.

Figure 2F:
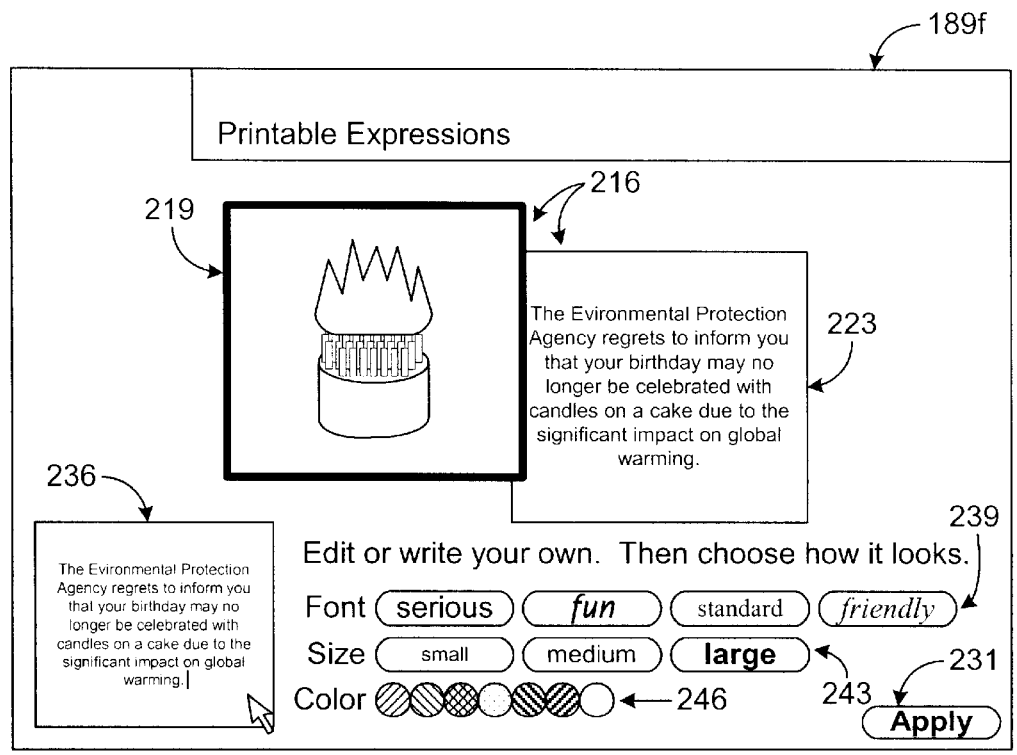

Turning then to FIG. 2F, shown is a logical creative expression 216 along with a custom text entry box 236. The user may click on the custom text entry box and then enter appropriate text therein to alter the block of text 223 accordingly. The sixth graphical user interface 189f also includes font selections 239, size selections 243 and color selections 246 that one may apply appropriately to the text in the custom text entry box 236 by clicking on the desired selection for each as shown. The sixth graphical user interface 189f also includes an apply button 231 that is selected when the desired greeting is finished.

Figure 2G:
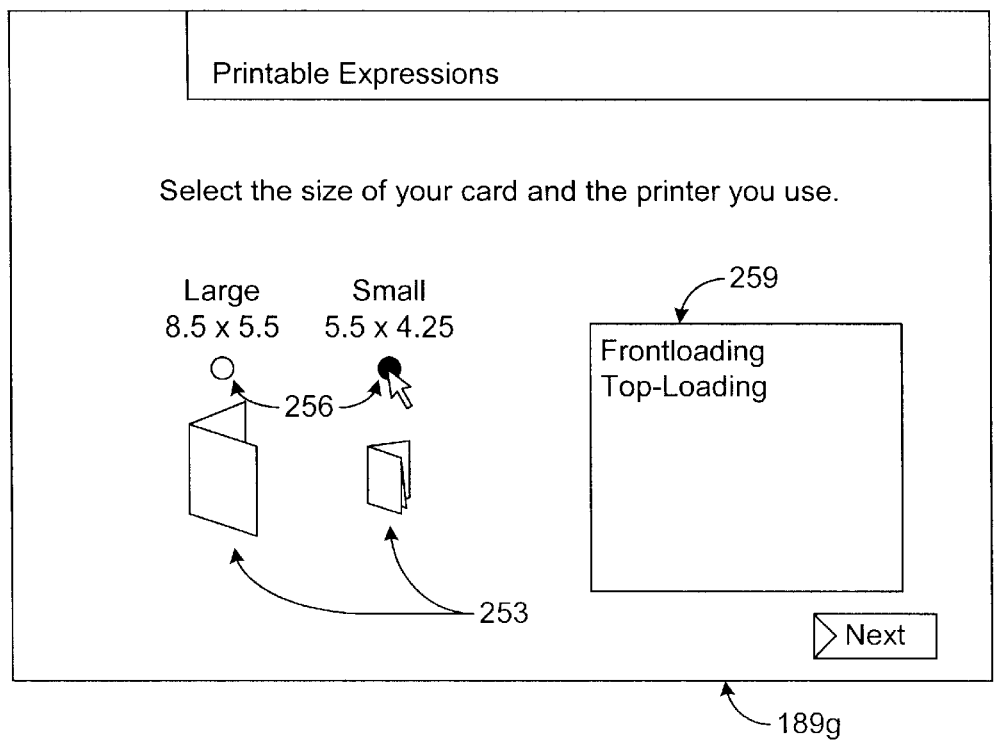

With reference to FIG. 2G, shown is a seventh graphical user interface 189g that appears on the display device 176 (FIG. 1) when the apply button 231 (FIGS. 2E and 2F) is depressed from the graphical user interfaces 189e and 189f. The seventh graphical user interface 189g includes a number of templates 253 that may be selected by clicking on a particular selection device 256 as shown. The seventh graphical user interface 189g also includes a printer selection box 259 through which the user may select the type of printer that they wish to use to print out the creative expression. The templates 253 generally define the physical form of the creative expression itself. For example, as shown, the creative expressions may be in the form of one of two different greeting cards. The greeting cards may have an image on the front and a block of text in the middle, or multiple images and text blocks in various locations, etc.

Figure 2H:
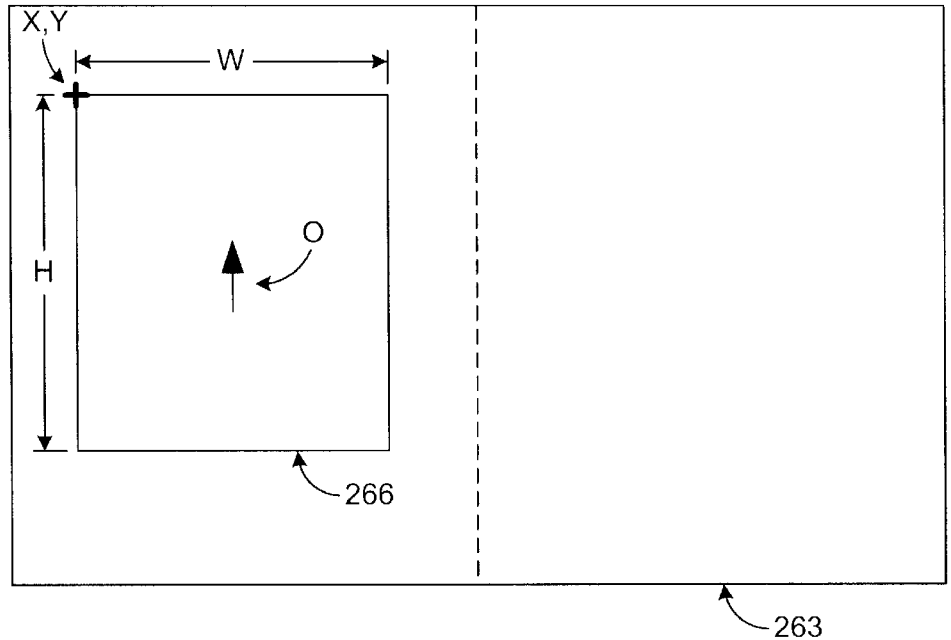
FIG. 2H is a drawing of an exemplary template for a creative expression generated by the creative expression system of FIG. 1.

With reference then to FIG. 2H, shown is an example of a page 263 of a particular template 253. The page 263 may be the exterior, for example, of one of the templates 253 as depicted in FIG. 2G. The page 263 includes at least one region 266 that defines the space in which an image or a block of text may be placed. The region 266 includes a height H and a width W as shown. The region 266 also includes an orientation O that indicates the orientation of either an image or a block of text placed within the region 266. Other parameters may be included in the template 253 as well, including the location of the center coordinates X and Y of the region 266 relative to the page 263, a parameter indicating any necessary scaling to fit an image to the region 266, and horizontal/vertical alignment of the region 266. Although a single page 263 is shown, it is understood that each template 253 may comprise multiple pages, wherein each page 263 has one or more regions 266 associated therewith.

Referring back to FIG. 1, it is understood that the creative expression logic 193, the affiliate logic 196, and the client print logic 199 are preferably encoded using an object oriented approach with a suitable object oriented language such as, for example, Java language by Sun Microsystems, or other suitable programming language. However, it is understood that software designs other than object oriented designs may be employed as well. Thus, although the following discussion of the software portions is discussed in the context of an object oriented design, it is understood that the functionality described therein may be implemented in a non-object oriented design as can be appreciated by one skilled in the art.

Figure 3:
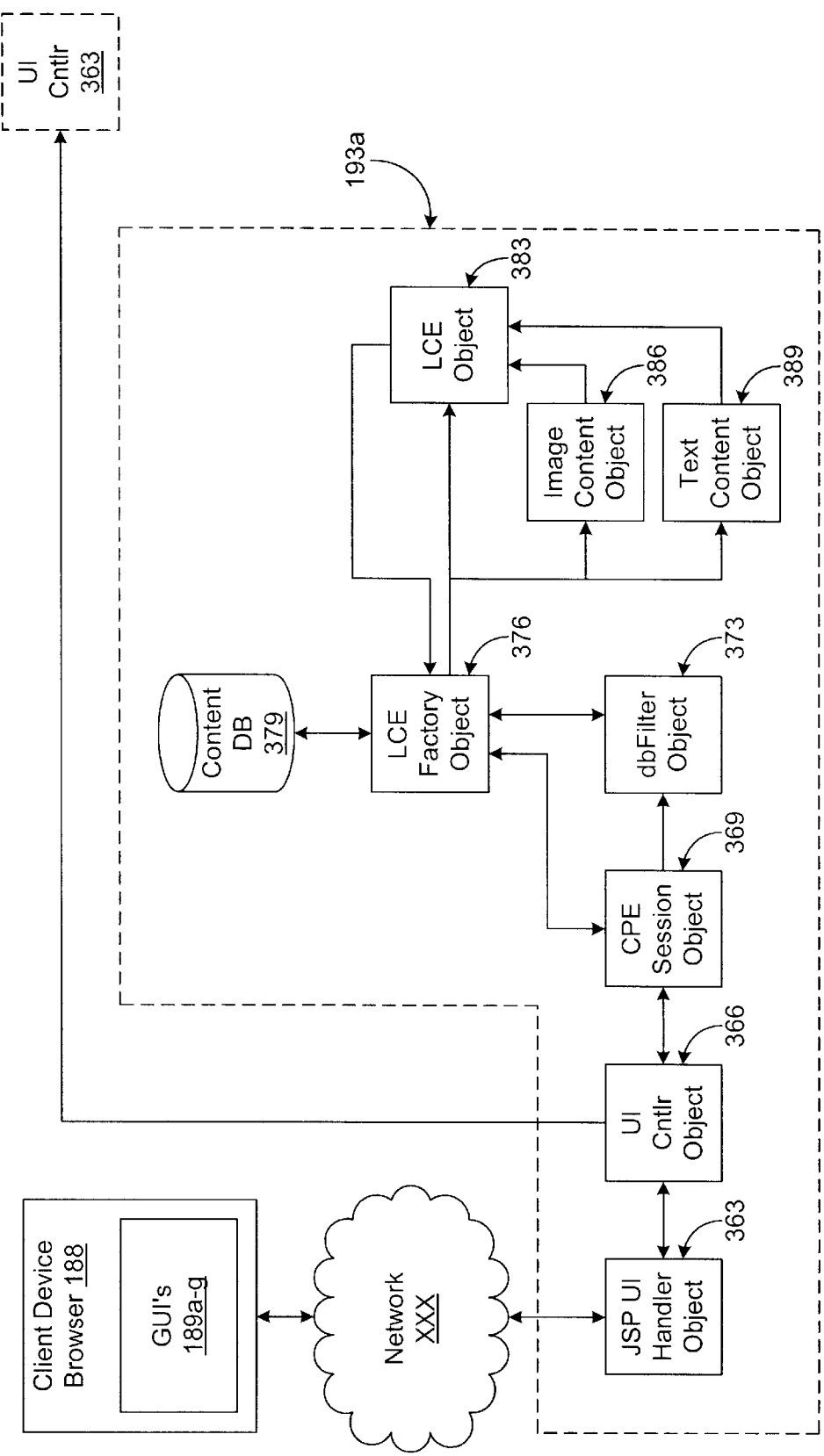
FIG. 3 is a block diagram of create logic employed in the creative expression system of FIG. 1.

Turning to FIG. 3, shown is a functional block diagram of the create logic 193a that is executed on the application server 103 (FIG. 1). In addition, the create logic 193a may also be executed on the affiliate server 106 (FIG. 1) depending on the particular implementation. The create logic 193a essentially defines the functionality that allows a user of the client device 109 (FIG. 1) to identify the particular content in terms of images, text blocks, and a template of the desired creative expression to be printed. In this regard, the create logic 193a includes a number of objects including a server page user interface handler object 363 (hereinafter "SPUI handler 363"), a user interface controller object 366 (hereinafter "UI controller 366"), a create and print engine session object 369 (hereinafter "CPE session 369"), and a data base filter object 373.

The SPUI handler 363 generates the number of graphical user interfaces 189a–g (FIGS. 2A–2G) to be transmitted to the client device 109 (FIG. 1) over the network 113 (FIG. 1) and displayed on the client device browser 188 (FIG. 1). The SPUI handler 363 may comprise, for example, a Java server page user interface handler using the Java language by Sun Microsystems, Inc. The SPUI handler 363 interfaces with the UI controller 366. In particular, the SPUI handler 363 provides the UI controller 366 with the various inputs received from the client device 109 and the UI controller 366 responds by informing the SPUI handler 363 which graphical user interface 189a–g to create and transmit to the client device 109. The UI controller object 366 also includes other functionality as well as will be discussed with reference to later figures.

The CPE session 369 interfaces with the UI controller 366 to cause a generation of a number of logical creative expressions 216 (FIG. 2E) based upon the inputs received from the client device 109. In particular, the CPE session 369 causes an instantiation of a logical creative expression factory object 376 (hereinafter "LCE factory 376"). The CPE session 369 places a number of search parameters in the database filter 373 including the expression category designations 213 (FIG. 2C) that are employed by the LCE factory 376 to perform a search for a particular set of logical creative expressions in a content database 379. The CPE session 369 also causes the LCE factory 376 to implement a method whereby a number of logical creative expressions objects are created that represent the logical creative expressions 216 identified by the search in the content database 379.

In addition, a number of image content objects 386 and text content objects 389 are generated and associated with respective logical creative expression objects 383. The number of logical creative expressions 383 generated by the LCE factory 376 are then supplied back to the CPE session 369 which in turn supplies the same to the UI controller object 366. The UI controller object 366 then can provide the same to the SPUI handler 363 that in turn transmits them in the graphical user interfaces 189a–g in conjunction with the creation function of said interfaces.

Figure 3A:
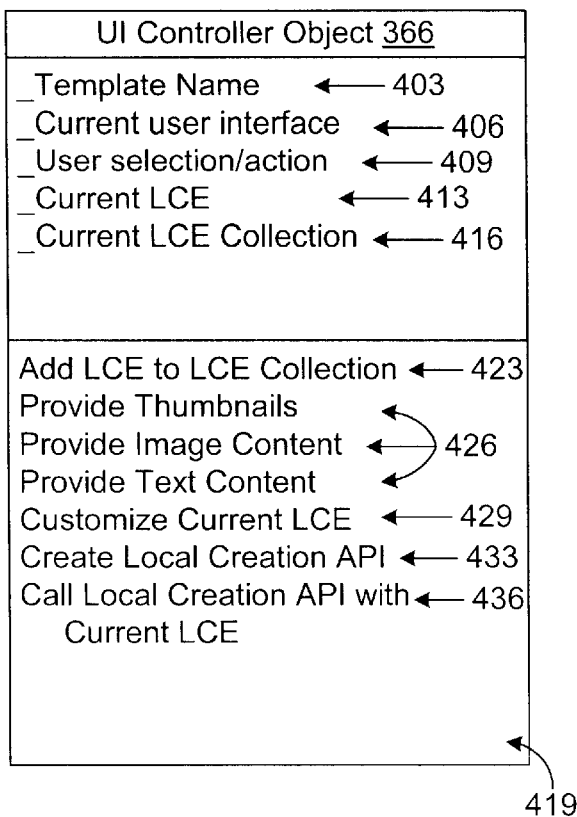
FIGS. 3A–3E are block diagrams of objects that comprise the create logic of FIG. 3.

Turning then to FIG. 3A, shown is a block diagram of the UI controller 366 that illustrates the particular state and methods encapsulated therein. In particular, the UI controller 366 contains several variables including a template name 403, a current user interface 406, a user selection/action 409, a current logical creative expression object 413, and a current logical creative expression collection 416. The template name 403 is associated with a particular template 253 chosen for the desired creative expression by the user at the client device 109 (FIG. 1). The current user interface variable 406 indicates which graphical user interface 189a–g (FIGS. 2A–2G) is currently displayed on the browser 188 (FIG. 1) of the client device 109. The user selection/action variable 409 refers to any particular user selection or action taken with respect to the graphical user interfaces 189a–g as received from the SPUI handler 363 (FIG. 3). The current logical creative expression 413 refers to the one of the number of logical creative expressions 216 (FIG. 2D) that is chosen by the user for printing by way of the graphical user interfaces 189a–g. Finally, the current logical creative expression collection 416 refers to the number of logical creative expressions 216 that are generated based upon a particular expression category designation 213. The UI controller 366 also includes a number of methods 419 that comprise the functionality encapsulated therein.

The first method is the "Add LCE to the LCE Collection Method 416". This method is called by the LCE factory 376 (FIG. 3) to add a particular LCE object 383 to the current LCE collection 416 in the UI controller 366. The methods 419 also include view methods 426 to provide thumbnail views, image content, and text content to the SPUI handler 363 (FIG. 3) for inclusion in the graphical user interfaces 189a–g as appropriate. Also, the methods 419 include a "Customize Current LCE" method 429 that is called to copy the current LCE 413, the new copied LCE therefrom being included in the current LCE collection 416. The new copied LCE also becomes the current LCE 413 and the user may then alter the text portion as desired as was discussed with reference to FIG. 2F. In particular, the SPUI handler 363 calls the Customize Current LCE method 429 when the user has depressed the custom button 233 (FIG. 2E) in the graphical user interface 189e (FIG. 2E). The UI controller 366 also includes a "Create Local Creation application programming interface (API)" method 433 and a Call Local Creation API method 436. These methods are called when the user depresses the apply button 231 (FIGS. 2E and 2F) to cause the current LCE 413 to be printed as will be discussed.

Figure 3B:
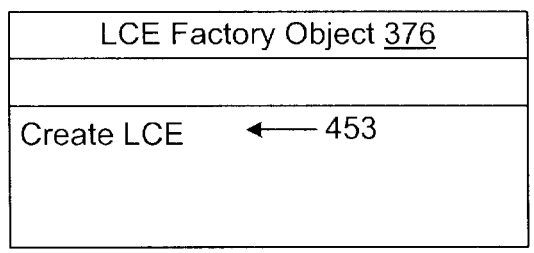

Turning then to FIG. 3B, shown is the LCE factory 376 according to an embodiment of the present invention. Of significant importance is the create LCE method 453 of the LCE factory that is called by the CPE session 369 (FIG. 3) when the database filter 373 (FIG. 3) has received the current expression category designation 213 (FIG. 2C). The Create LCE method 453 will be discussed in greater detail with reference to later figures.

Figure 3C:
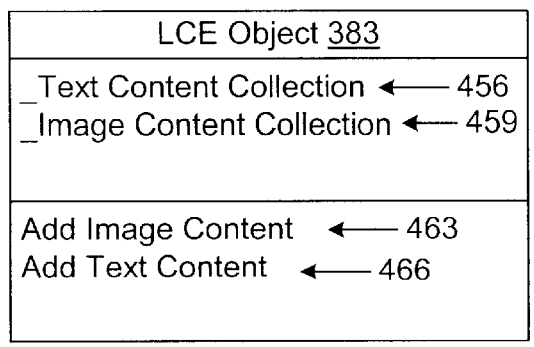

With reference to FIG. 3C, shown is an LCE object 383 according to another embodiment of the present invention. The variables of the LCE object 383 include a text content collection 456 and an image content collection 459. The text content collection 456 and image content collection 459 comprise the image and text content objects 386 and 389 (FIG. 3) that are associated with the LCE object 383. The methods of the LCE object 383 include an "Add Image Content" method 463 and an "Add Text Content" method 466. These methods are called to add particular text and image content objects 386/389 to the LCE object 383. The add image and add text content objects 463 and 466 are called by the LCE factory 376 (FIG. 3) in supplying the particular image and text content objects 386 and 389 to be associated with the LCE object 383.

Figure 3D:
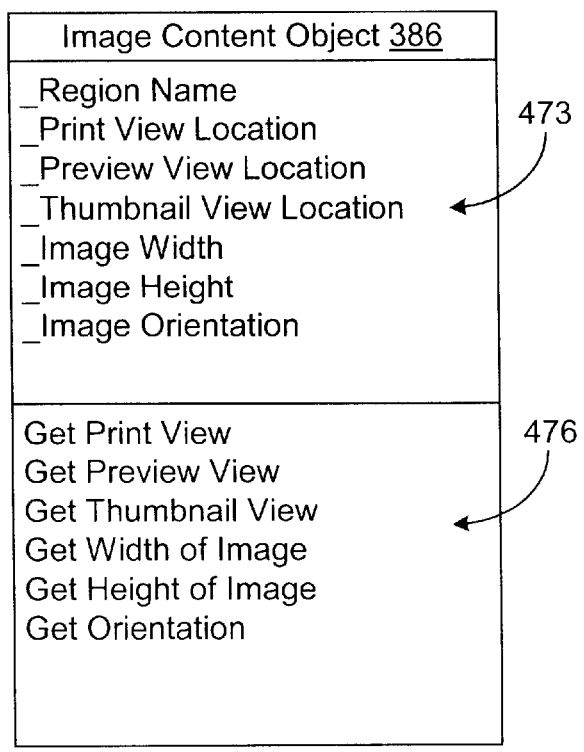

Turning then, to FIG. 3D, shown is the image content object 386 according to an embodiment of the present invention. The image content object 386 includes a number of variables 473 that essentially hold the uniform resource locators (URLs) of the various parameters relating to the particular image held by the image content object 386 according to the hypertext transfer protocol (HTTP). In particular, the parameters 473 include a region name that identifies a particular region on a template to which the image of the image content object 386 is associated. The other variables 473 include the URLs of the print view, preview view, thumbnail view, image width, image height, and the image orientation. The methods of the image content object 386 include methods to obtain or "get" the print view, preview view, thumbnail view, width, height, and orientation of the particular image associated with the image content object 386.

Figure 3E:
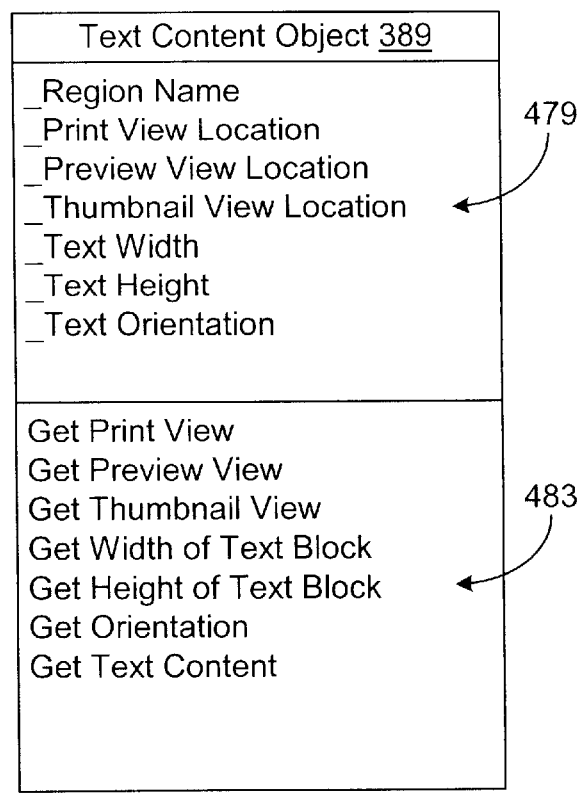

With reference to FIG. 3E, the text content object 389 similarly includes several URLs pointing to several parameters 479, including the region name of a region located on the various templates to which the text block contained by the text content object 389 is associated. In addition, the text content object 389 also includes URLs for the print view, preview view, thumbnail view, text width, text height, and text orientation of the text block that is associated with the text content object 389. The text content object 389 also features methods 483 to obtain the variables 479 based upon their location. In particular, the methods 483 include methods to obtain or "get" the print view, preview view, thumbnail view, width, height, and orientation of the text block as well as the text content of the text block itself.

Figure 3F:
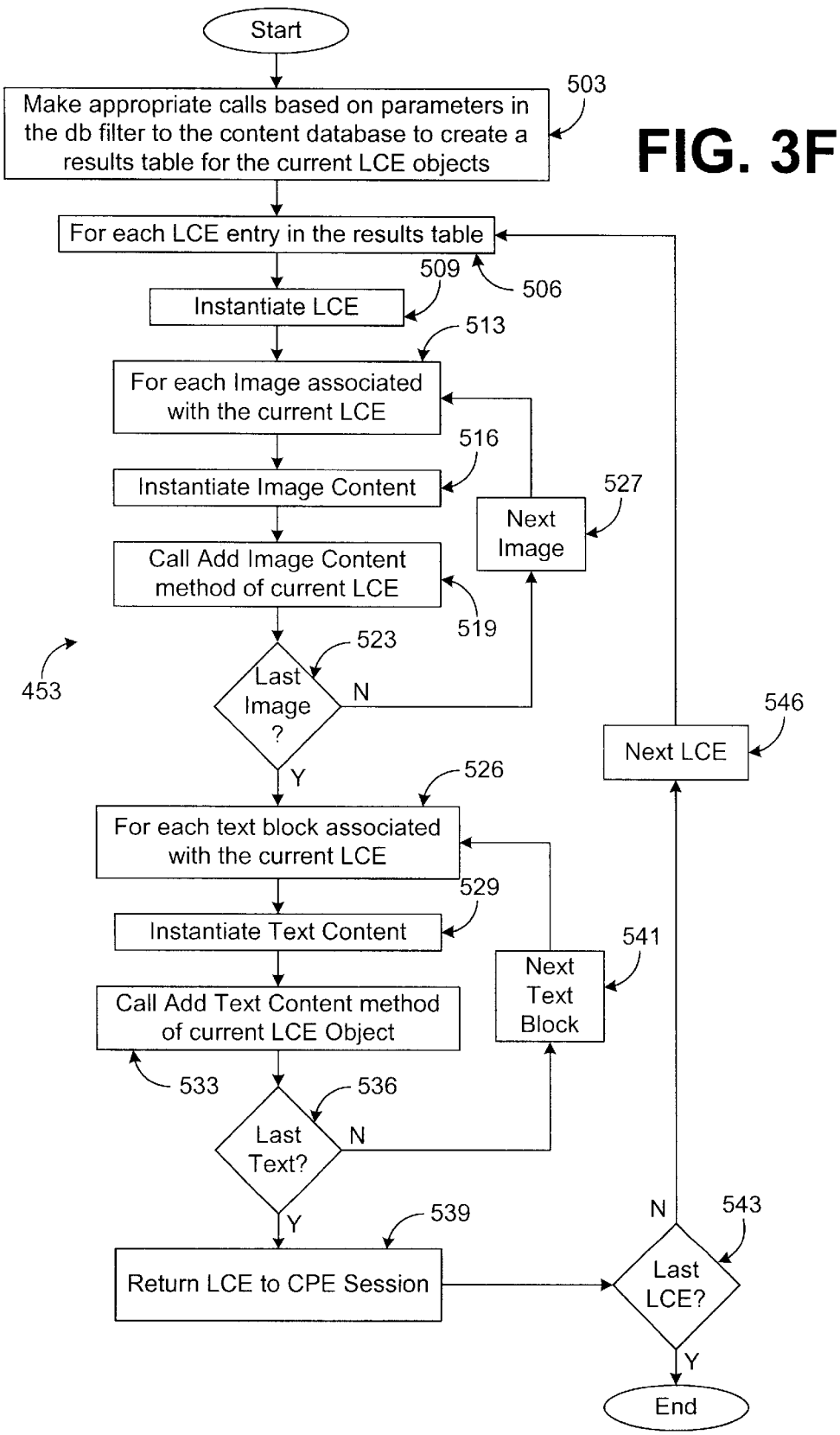
FIG. 3F is a flow chart of a logical creative expression creation method of the object of FIG. 3B.

Referring to FIG. 3F, shown is a flow chart of the create LCE method 453 of the LCE factory 376 (FIG. 3B) according to an embodiment of the present invention. In particular, the create LCE method 453 instantiates the LCE object 383 as well as the associated image content objects 386 and text content objects 389 (FIG. 3) and includes them in the LCE object 383. Beginning with block 503, the create LCE method 453 makes appropriate calls to the content database 379 (FIG. 3) based upon the parameters such as the expression category designation 213 (FIG. 2C) that has been placed in the database filter 373 by the CPE session 369 (FIG. 3). The information obtained from the content database 379 is placed in a results table that identifies the current LCE objects 383. Thereafter, in block 506, a loop is commenced for each LCE entry in the results table that was created. Next, in block 509, for the current LCE entry in the results table, an LCE object 383 is instantiated. Thereafter, in block 513, a loop is commenced for each image associated with the current LCE object 383 instantiated in block 509. In block 516, an image content object 386 (FIG. 3) is instantiated. Thereafter, in block 519, the add image content method 463 (FIG. 3C) is called in the instantiated LCE object 383 which then associates the current image content object 386 with the current LCE object 383 accordingly. Next, in block 523, it is determined whether the last image associated with the current LCE entry in the results table has been associated with the instantiated LCE object 383. If such is the case, then the create LCE method progresses to block 526. Otherwise, the create LCE method 453 moves to block 527 to identify the next image entry in the results table. Thereafter, the creative LCE method 453 reverts back to block 513.

In block 526, a second loop is commenced for each text block in the results table associated with the current LCE. Thereafter, in block 529, a text content object 389 (FIG. 3E) is instantiated for the identified text block. Then, in block 533, the add text content method 466 (FIG. 3C) is called in the LCE object 383 to associate the instantiated text content object 389 with the LCE object 383. Then, in block 536, if the text content object 389 is the last in the results table, then the create LCE method 453 progresses to block 539. Otherwise, the create LCE method 453 moves to block 511 in which the next text block in the results table is identified. Thereafter, the create LCE method 453 reverts back to block 526 accordingly. In block 539, the complete LCE object 383 is returned to the CPE session 369 which calls the "Add LCE to LCE Collection" method 423 (FIG. 3A) in the UI controller object 366 )FIG. 3A) to add the recently instantiated LCE object 383 to the current LCE collection 416 (FIG. 3A). Thereafter, in block 543, it is determined whether the last LCE object 383 has been instantiated from the results table. If not, then the create LCE method 453 moves to block 546 in which the next LCE in the results table is located for the process to be repeated at block 506. Otherwise, the create LCE method 453 ends.

Figure 4:
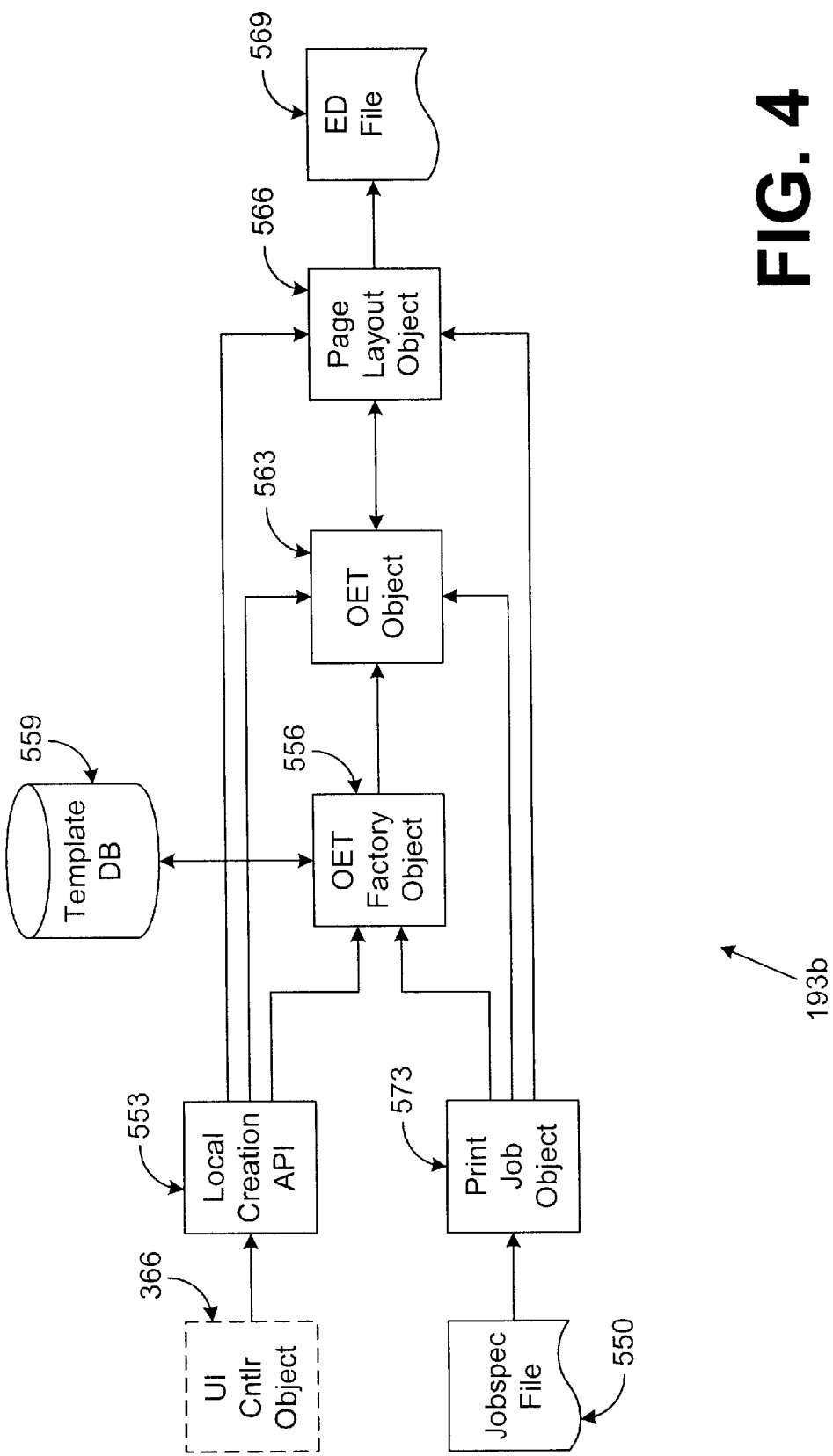
FIG. 4 is a block diagram of build logic employed in the creative expression system of FIG. 1.

With reference to FIG. 4, shown is the build logic 193b according to another embodiment of the present invention. In general, the build logic 193b receives the LCE object 383 (FIG. 3C) from either the UI controller 366 (FIG. 3A) or, from the affiliate server 106 (FIG. 1) in the form of a jobspec extensible mark-up language (XML) file (hereinafter "jobspec file"), or other suitable data file format. In particular, the UI controller 366 provides the LCE object 383 where the creation of the LCE object 383 itself occurs in the application server 103 (FIG. 1). The LCE object 383 is encapsulated within the jobspec file 550 where the creation of the LCE object 383 occurs in the affiliate server 106.

Assuming that the LCE object 383 has been created in the UI controller 366, the UI controller 366 then executes the "create local creation API" method 433 (FIG. 3A) which causes the instantiation of a local creation API 553. The UI controller object 366 then executes the "call local creation API" method 436 (FIG. 3A) and provides the current LCE object 383 to the local creation API 553. The UI controller 366 also provides the template name to the local creation API 553. The local creation API 553 then causes an output expression template factory object 556 (hereinafter "OET factory 556") to be instantiated. The OET factory 556 obtains information relating to the specific template identified by the template name provided to it by local creation API 553 from the template database 559. The OET factory 556 then causes the instantiation of an output expression template object 563 (hereinafter "OET object 563"). The OET object 563 represents the marriage of the template 253 (FIG. 2H) with the LCE object 383 (FIG. 3C).

Once the OET object 563 has been created, the local creation API 553 causes the instantiation of a page layout object 566 that translates the information relating to the creative expression contained in the OET object 563 into the form of an expression definition file 569. The expression definition file 569 comprises an extensible mark-up language file or other suitable file format to transport data across the network 113 (FIG. 1) from the applications server 103 (FIG. 1) to either the client device 109 (FIG. 1) or the affiliate server 106 (FIG. 1) depending on which location is appropriate for the specific application.

The build logic 193b also includes a print job object 573 that is instantiated upon the receipt of a jobspec file 550. The print job object 573 processes the information from the jobspec file 550, thereby generating an appropriate LCE object 383. The print job object 573 then performs essentially similar functions of the local creation API 553 to ultimately cause the creation of an expression definition file 569 as will be discussed. Note that the build engine 193b ultimately creates an expression definition file from an LCE object 383 and a template, whether the LCE object 383 is created by the create logic 193a (FIG. 3) or received from the affiliate server 106 in the form of ajobspec file 550.

Figure 4A:
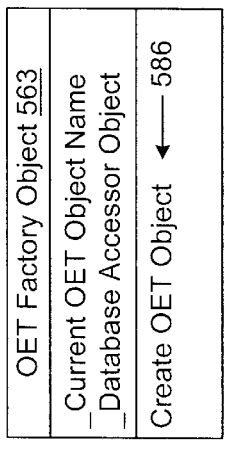
FIGS. 4A–4E are block diagrams of objects that comprise the build logic of FIG. 4.

With reference then to FIG. 4A, shown is the local creation API 553 that includes among its variables the current LCE object 383 and the template name 403. The local creation API 553 also includes a Do Print method 583 that is executed when called by the UI controller object 366 (FIG. 3A).

Figure 4B:
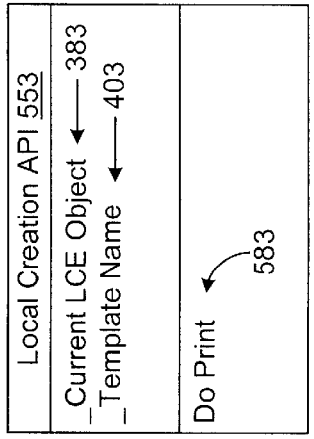

With reference to FIG. 4B, shown is the expression template factory object 563. The OET factory object 556 includes variables that point to the name of the current OET object 563 as well as a database accessor object to access the appropriate template information in the template database 559 (FIG. 4). The OET factory object 556 also includes a "create OET object" method 586 that causes an instantiation of the OET object 563 and other functionality as will be discussed.

Figure 4C:
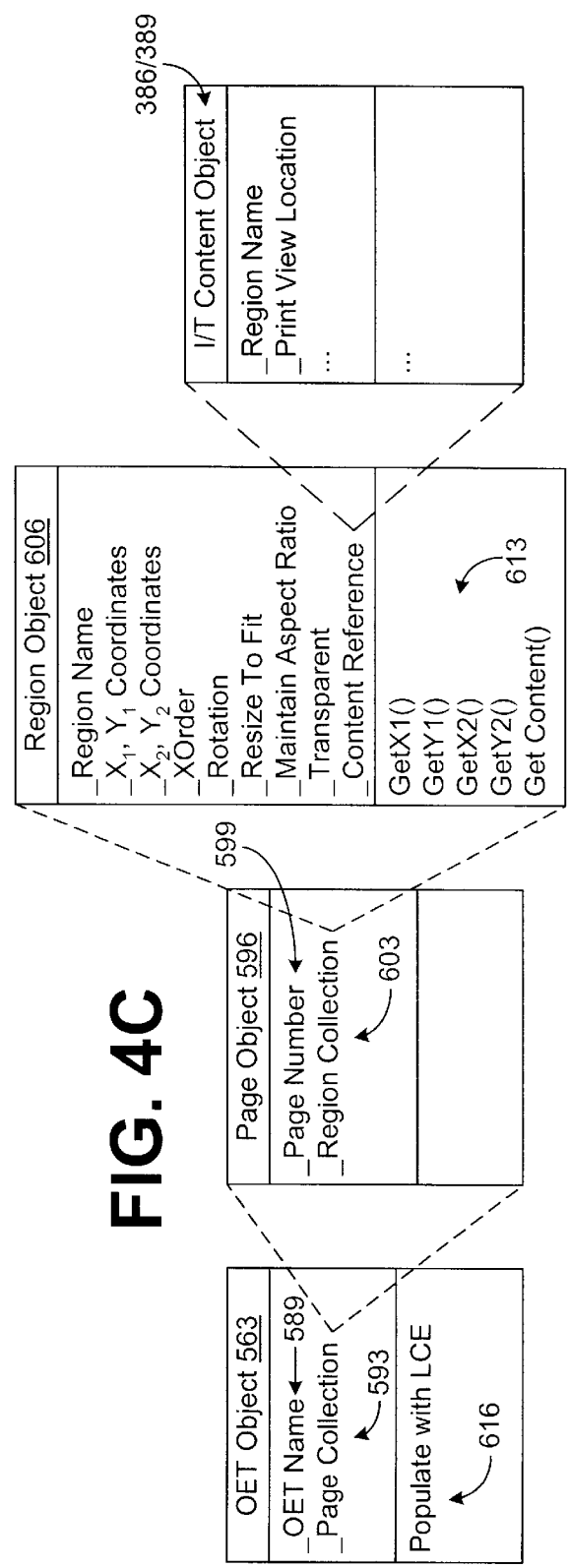

Referring next to FIG. 4C, the OET object 563 is shown to include a number of subordinate objects. In particular, the OET object 563 includes an expression definition template name 589 and a page collection 593. The page collection 593 comprises a number of page objects 596. Each of the page objects 596 in the page collection 593 includes a page number 599 and a region collection 603. The region collection 603 comprises a number of region objects 606.

Each region object 606 includes a number of variables, such as, a region name, $X_1$ and $Y_1$ coordinates, and $X_2$ and $Y_2$ coordinates. These coordinates are employed to locate the particular region object 606 in a predefined position on a respective page object 596. Other variables of the region object 606 include an ZOrder, rotation, resize to fit, maintain aspect ratio, transparent, and a content reference. The ZOrder variable indicates the particular order over which a region is placed above or below other region objects 606 on a particular page represented by a respective page object 596.

The rotation variable provides the orientation of the region object on the page and the resize to fit variable refers to whether the content assigned to the particular region object should be shrunk to fit the particular region itself. The maintain aspect ratio variable indicates whether the aspect ratio of a particular image/text block should be maintained so as to ensure no unwanted stretching in one or two dimensions occurs. The transparent regions variable refers to whether regions or white or other appropriate color in an image or block of text are to be solid white or transparent to allow an image or text to be superimposed on top of another image as background etc. The resize to fit, maintain aspect ratio, and transparent regions variables may be, for example, a Boolean variable that may be one of two values to indicate yes or no as is known in the art.

Each region object 606 also includes a content reference variable that refers to a particular position in the memory 126 (FIG. 1), preferably RAM memory, of an image or text content object 386 or 389 that is associated with the region object 606. The region methods 613 include methods to obtain the various coordinates and content from the memory 126 as well as other methods not shown herein.

Associated with each region object 606 is an image or text content object 386 or 389 as shown. As discussed before, each image and text content object 386/389 includes a region name of a region in template 253 (FIG. 2H) to which the particular content object 386/389 is associated. Note then, that the region name in the image/text content object 386/389 will match a particular region name of one of the region objects 606 of a particular OET object 563. The fact that both region names stored in the region object 606 and the image or text content objects 386 or 389 are the same provide a means by which the two can be associated as will be discussed. Also note that the OET object 563 includes a populate method 616 that is used to associate a particular image or text content object 386 or 389 with a particular region object 606 as will be discussed.

Figure 4D:
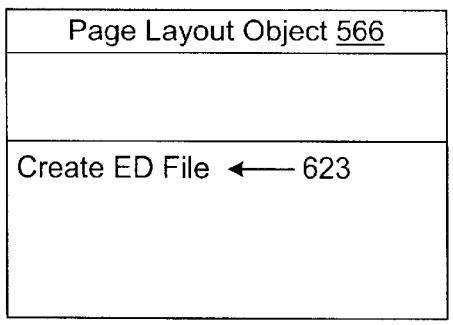

With reference to FIG. 4D, shown is the page layout object 566. Of primary importance in the page layout object 566 is the "create ED file" method 623 that is called to create the expression definition file 569 (FIG. 4) from the expression definition template 563 (FIG. 4).

Figure 4E:
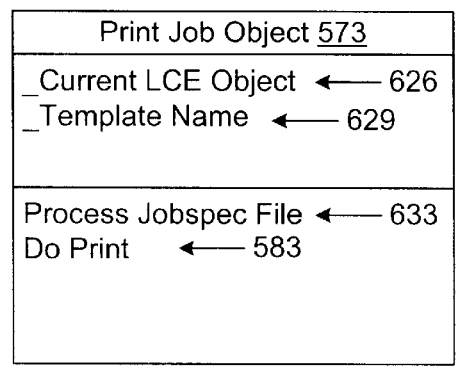

Turning then to FIG. 4E, shown is the print job object 573 according to yet another embodiment of the present invention. The primary variables of the print job object 573 include a current LCE object 626 and a template name 629 that are obtained from the jobspec file 550 (FIG. 4). The methods of the print job object 573 include a "process jobspec file" method 633 and the "Do Print" method 583 that is also executed by the local creation API 553 (FIG. 4A). Generally the process jobspec method 633 is employed to obtain the current LCE object 626 and the template name 629 from the jobspec file 550. The Do Print method 583 includes the functionality executed that ultimately results in an expression definition file 569 (FIG. 4) given the current LCE object 626 and a template name 629.

Figure 4F:
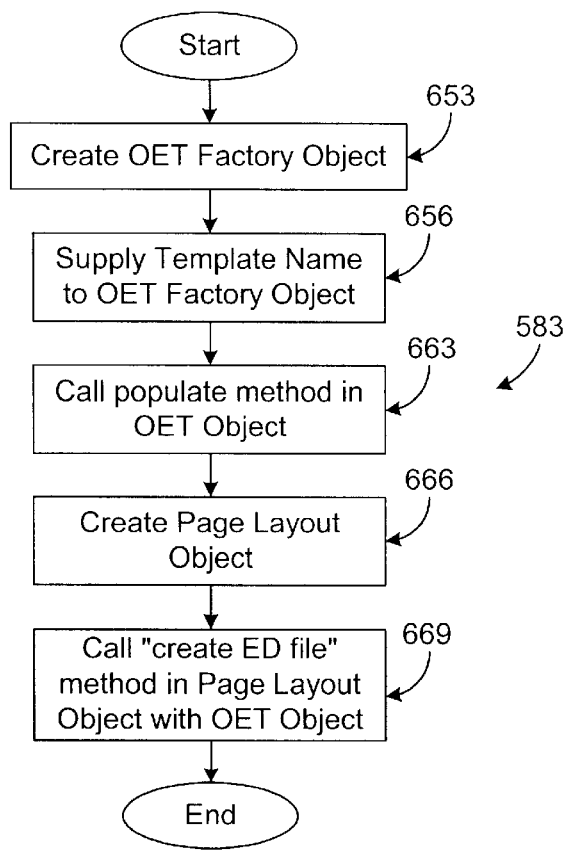
FIGS. 4F–4I are flow charts of methods of respective objects of FIGS. 4A–4E.

Turning to FIG. 4F, shown is a flow chart of the "Do Print" method 583 of the local creation API 553 (FIG. 4A). The Do Print method 583 causes the creation of the OET factory object 556 (FIG. 4) which, in turn, creates the OET object 563 (FIG. 4) as well as the page layout object 566 (FIG. 4). Beginning with block 653, the Do Print method 583 creates the OET factory object 556. Thereafter, in block 656, the Do Print method 583 supplies the template name to the OET factory object 556 which triggers the OET factory object 556 to create the OET object 563 that is returned thereto.

Once the OET factory object 556 returns the OET object 563, thereby indicating that the creation of the OET object 563 is complete, the Do Print method 583 continues to block 663 where the populate method 616 (FIG. 4C) in the. OET object 563 is called. Thereafter, in block 666, the page layout object 566 (FIG. 4) is created. Then, in block 669, the "create expression definition (ED) file" method 623 (FIG. 4D) in the page layout object 573 is called and the OET object 563 is supplied thereto so that the page layout object 566 can create the expression definition file 569 (FIG. 4).

Figure 4G:
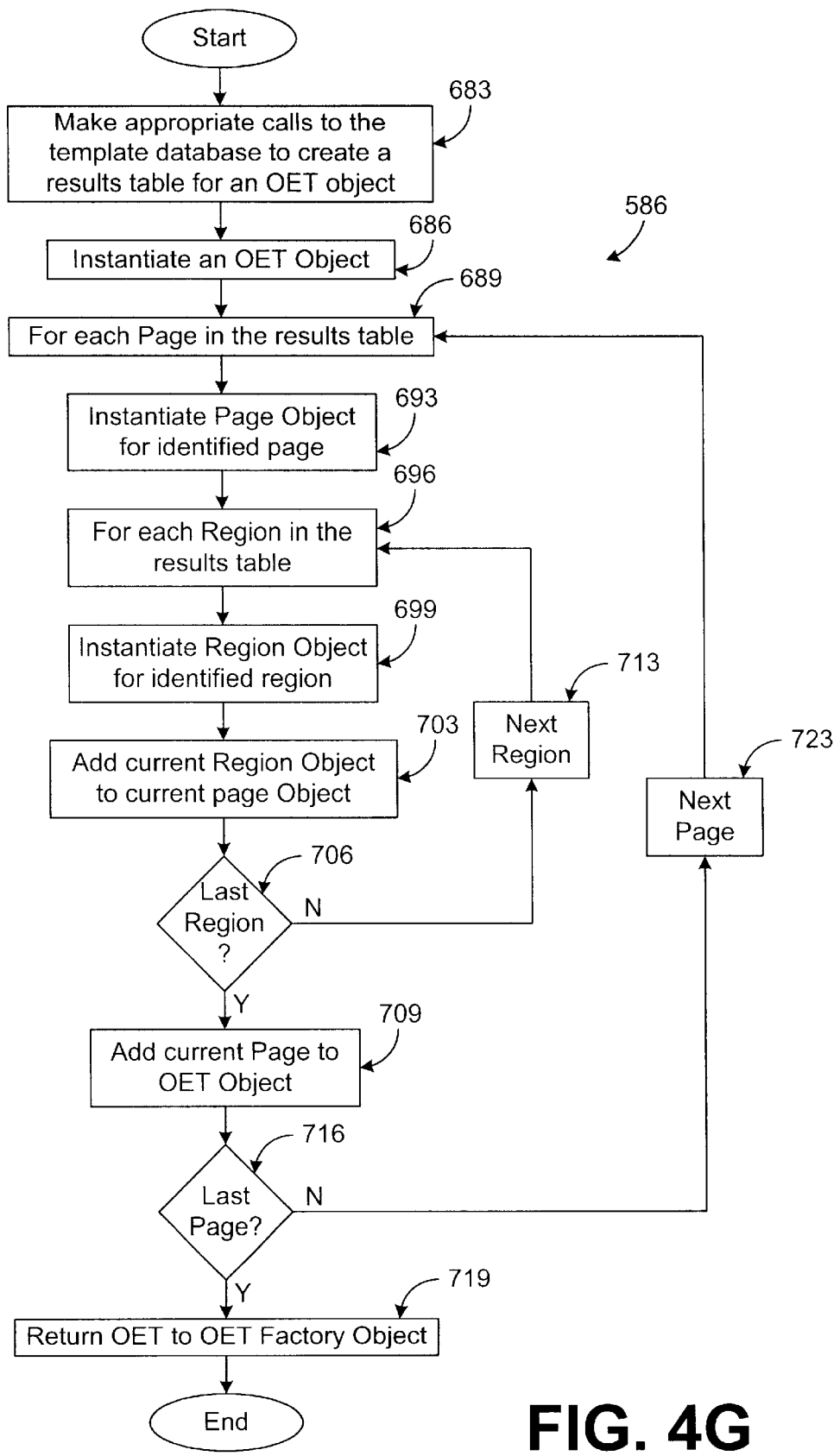

With reference to FIG. 4G, shown is the create OET object method 586 of the OET factory object 563 (FIG. 4B). The create OET method 586 is executed to create the OET object 563 (FIG. 4C) along with its associated page objects 596 (FIG. 4C) and associated region objects 606 (FIG. 4C). Beginning with block 683, the create OET method 586 makes appropriate calls to the template database 559 (FIG. 4) to create a results table for a particular OET object 563 (FIG. 4). Then, in block 686, an OET object 563 is instantiated.

Thereafter, in block 689, a first loop is begun for each page of the OET object 563 instantiated in block 686 as indicated in the results table. Thereafter, in block 693, a page object 596 is instantiated for an identified page in the results table that is associated with the OET object 563. Next, in block 696, a second nested loop is begun for each region object 606 that is associated with the current page object 596 instantiated in block 693.

Thereafter, in block 699, a region object 606 is instantiated for an identified region in the results table that is associated with the current page object 596. Thereafter, in block 703, the new region object 606 is added to the current page object 596. In block 706, it is determined whether the last region object 606 associated with the current page object 596 has been instantiated as indicated by the results table. If such is the case, then the create OET method 586 progresses to block 709. If not, then the create OET method 586 moves to block 713 in which the next region in the current page is identified in the results table. Thereafter, the create OET method 586 reverts back to block 696 accordingly.

Assuming that the create OET method 586 progresses to block 709, then the current page object 596 is added to the current OET object 563. Next, in block 716, it is determined whether the last page of the OET object 563 identified in the results table has been created. If such is the case, then the create OET method 586 moves to block 719. Otherwise, the create OET method 586 moves to block 723 in which the next page is identified in the results table and then the create OET method 586 reverts back to block 689 as shown. Assuming that the create OET method 586 continues to block 719 from block 716, the newly created OET object 563 is returned to the OET factory object 719 which in turn informs the local creation API 563 that the OET object 563 has been created as was discussed in block 659 (FIG. 4F) previously. Thereafter, the create OET method 586 ends accordingly.

Figure 4H:
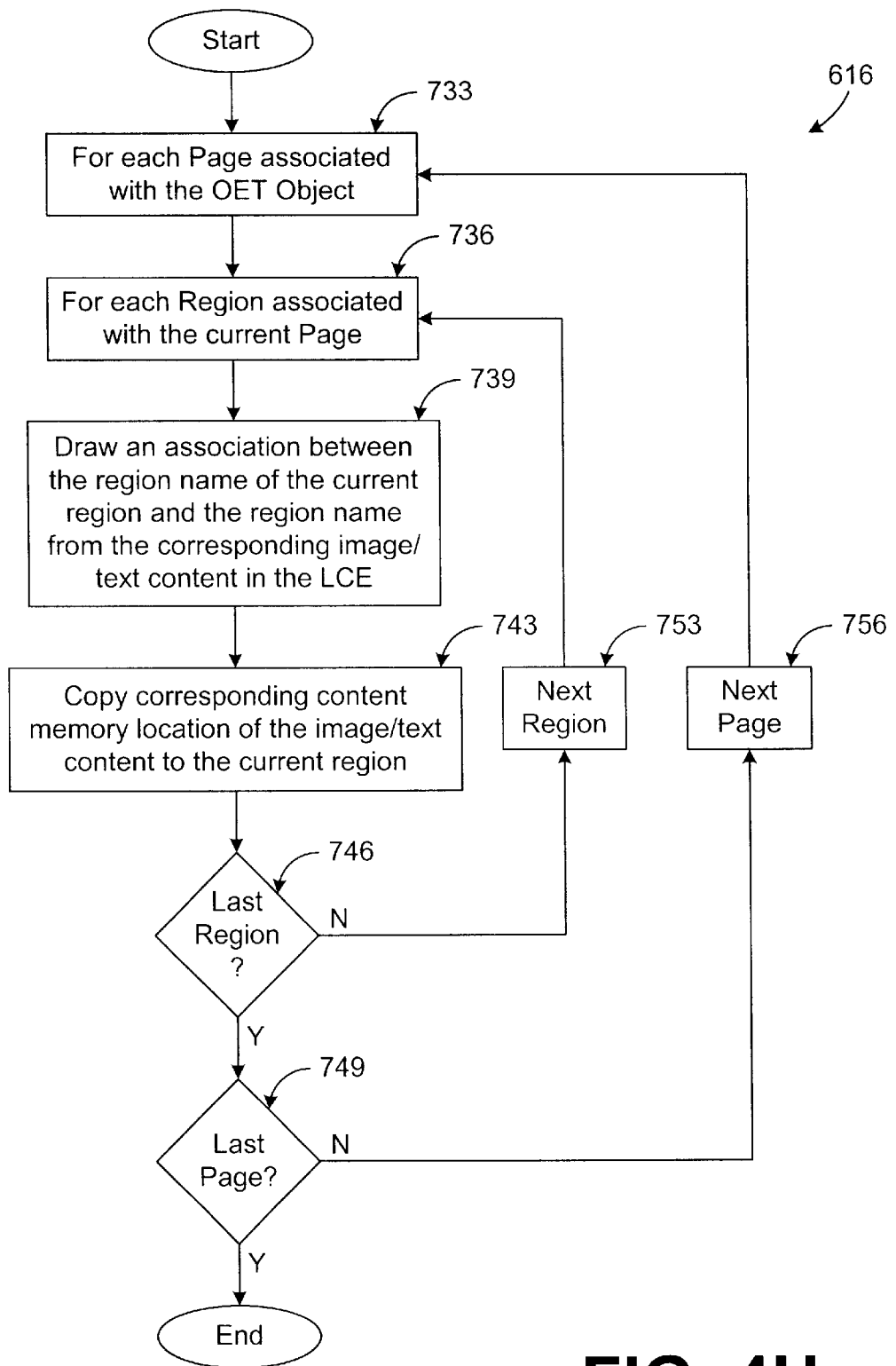

Turning next to FIG. 4H, shown is the populate method 616 that is called by the Do Print method 583 (FIG. 4F) and is located in the OET object 563 (FIG. 4C). The populate method 616 essentially draws an association between the region names of a particular region object 606 (FIG. 4C) and image/text content objects 386/389 (FIGS. 3D and 3E) associated therewith for a particular OET object 563. The populate method 616 then records the memory location of the associated image or text content object 386 or 389 into the region object 606 under the "content reference" variable of the image or text content object 386 or 389.

Beginning with block 733, the populate method 616 executes a first loop for each page object 596 (FIG. 4C) associated with a current OET object 563. Then, in block 736, a second loop is executed for each region object 606 associated with the current page object 596. In block 739, an association is drawn between a region name of the current region object 606 and the corresponding region name of the image and/or text content object 386 or 389 in the current LCE object 383 (FIG. 3C) that is supplied by the local creation API 553 (FIG. 4). Thereafter, in block 743, the corresponding content memory location of the image/text content object 386/389 is added to the current region object 606 under the content reference variable. Then, in block 746, a conditional operation is executed in which it is determined whether the last region object 606 associated with a particular page object 596 has been processed.

If such is the case, then the populate method 616 progresses to block 749. If not, then the populate method 616 moves to block 753 in which the next region object 606 associated with the particular page object 596 is identified. Thereafter, the populate method 616 reverts back to block 736, thereby continuing the region loop. If, however, the populate method 616 progresses to block 749, then the populate method 616 determines whether the last page object 596 has been processed accordingly. If not, then the populate method 616 moves to block 756 in which the next page object 596 associated with the current OET object 563 is identified and, thereafter, the populate method 616 reverts to block 733. Otherwise, if the last page object 596 has been processed as determined in block 749, then the populate method 616 ends accordingly.

Figure 4I:
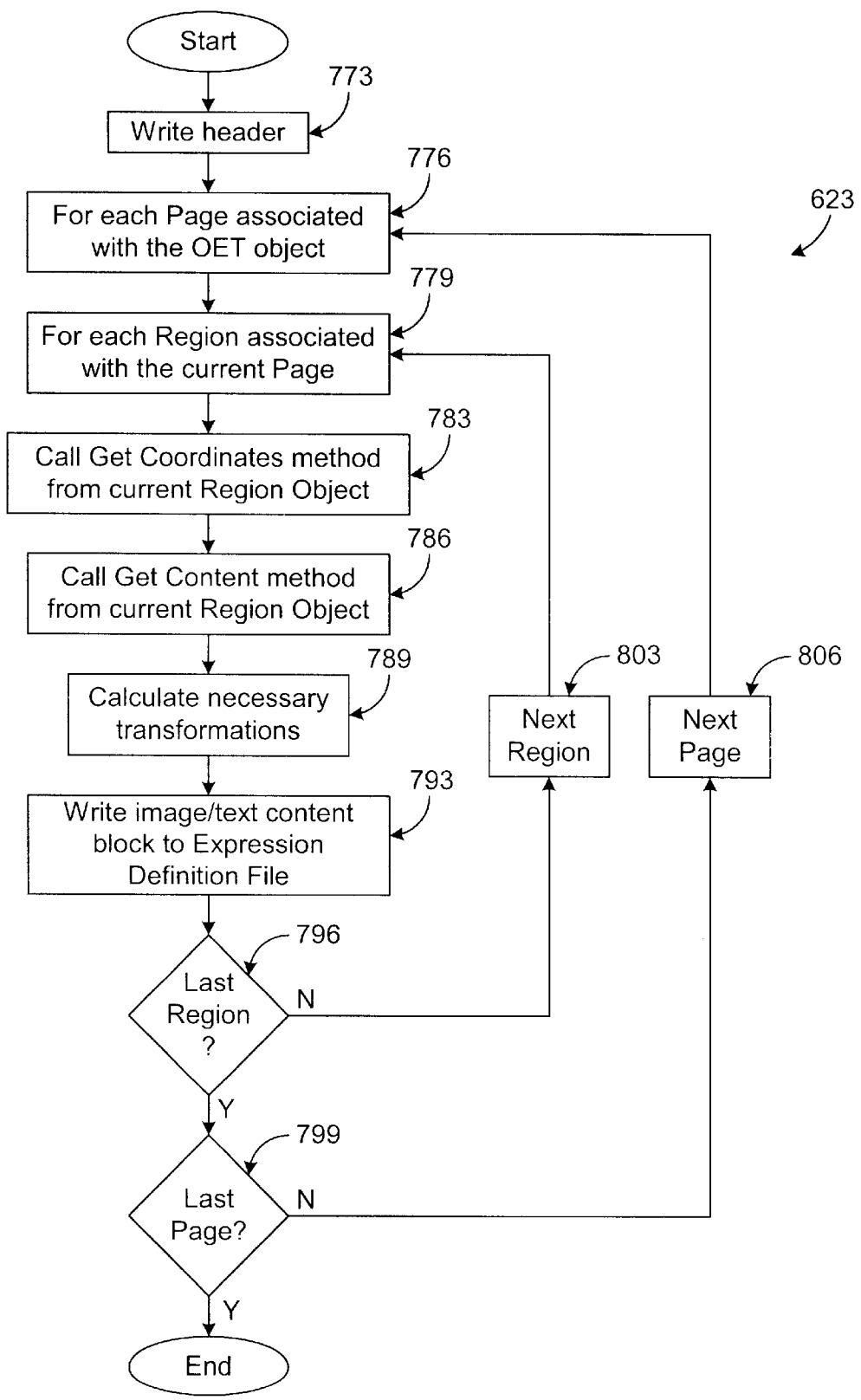

With reference to FIG. 4I, shown is the create ED file method 623 that is encapsulated within the page layout object 566 (FIG. 4D). The create ED file method 623 is executed to generate the expression definition file 569 (FIG. 4) from the OET object 563 (FIG. 4). Beginning with block 773, the create ED file method 623 writes and appropriate header into the expression definition file 569. Thereafter, in block 776, the create ED file method 623 begins a first loop for each page object 596 (FIG. 4C) associated with the OET object 563. Then in block 779, a second nested loop begins for each region object 606 (FIG. 4C) associated with each respective page object 596 of the OET object 563.

In block 783, the "get coordinates" methods of the current region object 606 are called to obtain the particular location coordinates of the respective region on the current page. Then, in block 786, the "get content" method is called in the current region object 606 to obtain the HTTP address of the image or text content associated with the current region object 606. Alternatively, the actual image or text may be obtained in place of the HTTP addresses. In addition, other parameters are obtained from the region object 606 including the ZOrder, rotation, resize to fit, maintain aspect ratio, and transparent regions variables. Then, in block 789, necessary transformations of the content to be placed in the particular region of the page are performed such as rotation and scaling modifications.

Thereafter, in block 793, a content block is written to the expression definition file 569 that identifies the particular region and content associated therewith. In particular, the region is identified as either an image or a block of text as will be discussed with reference to a particular expression definition file 569. Thereafter, in block 796, it is determined whether the last region object 606 associated with the current page object 596 has been processed. If such is the case, then the create ED file method 623 progresses to block 799. If not, then the create ED file method 623 moves to block 803 in which the next region object 606 is identified in the current page object 596. Thereafter, the create ED file method 623 reverts back to block 779 accordingly. Otherwise, in block 799, the create ED file method 623 determines whether the last page object 596 associated with the current OET object 563 has been processed. If not, then the create ED file method 623 moves to block 806 in which the next page object 596 is identified in the OET object 563 and the create ED file method 623 then reverts back to block 776. Otherwise, the create ED file method 623 ends accordingly.

With reference to FIG. 4J, shown is an example of an expression definition file 569 according to another embodiment of the present invention. The expression definition file includes a header section 823 and a single page. The page is identified by a set of page tags 826. Although only a single page is shown, it is understood that multiple pages may be included with appropriate page tags 826 designating each individual page accordingly. The uppermost page tag 826 includes a number of parameters relating to the size an orientation of the page itself. Within the page tags 826 are a number of content elements 829 that are identified by content tags 833. As shown in the example expression definition file 569, the content tags 833 are all image content tags. However, it is understood that text content tags could be employed as well.

Within the image content tags is the content 829 that defines the region on the particular page of the creative expression in question. In particular, the image is defined by x and y position coordinates, height, width, rotation angle, units of rotation, as well as the center of rotation. In addition, the content includes the HTTP address where the image may by found on the network 113 (FIG. 1). Note that this could also be the HTTP address for the text block in question or the content comprising a text block itself.

Figure 4K:
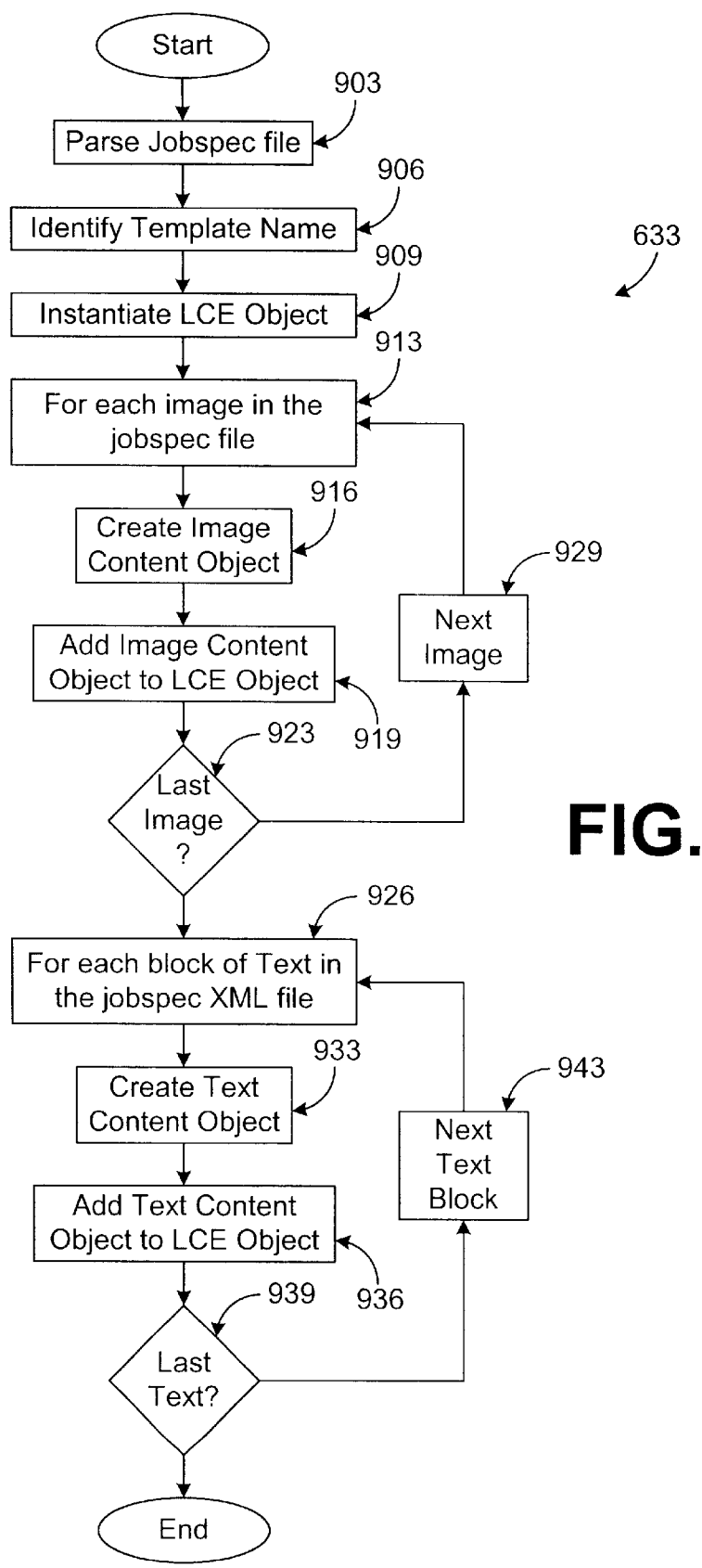
FIG. 4K is a flow chart of a jobspec file processing method of the object of FIG. 4E.

With reference to FIG. 4K, shown is the process job file method 633 that is encapsulated within the print job object 573 (FIG. 4E). The functionality of the print job object 573 assumes that the creative expression has been generated at the affiliate server 106 (FIG. 1) and the jobspec file 550 (FIG. 4) is transmitted to the applications server 103 (FIG. 1) to generate the expression definition file 569. The process jobspec method 633 is implemented to obtain a logical creative expression and a template name from the received jobspec file 550.

Beginning with block 903, the process jobspec method 633 parses the jobspec file 903 to identify the various components contained therein. Thereafter, in block 906, the template name contained in the jobspec file 550 is identified. Then, in block 909, an LCE object 383 (FIG. 3C) is instantiated in which to encapsulate the various image and content objects 386 and 389 that are to be generated from the content information contained in the jobspec file 550.

Next, in block 913, a first loop is initiated for each image contained in the jobspec file 550. In block 916, an image content object 386 (FIG. 3D) for the current image identified within the jobspec file 550. Thereafter, in block 919, the add image content method 463 (FIG. 3C) in the LCE object 383 is called to include the newly created image content object 386 into the LCE object 383. Then, in block 923, it is determined whether the last image in the jobspec file 550 has been accessed and instantiated. If so, then the process jobspec method 633 progresses to block 926. If not, then the process jobspec method 633 moves to block 929 in which the next image is identified in the jobspec file 550. Thereafter, the process jobspec method 633 reverts back to block 913.

In block 926, a second loop is commenced for each block of text contained in the jobspec file 550. Thereafter, in block 933, a text content object 389 (FIG. 3E) is created for the identified block of text in the jobspec file 550. Thereafter, in block 933, the add text content method 466 (FIG. 3C) is called in the LCE object 383 to add the newly created text content object 389 to the LCE object 383. Then, in block 393, it is determined whether the last text block in the jobspec file 550 has been instantiated into a text content object 389. If not, then the process jobspec method 633 moves to block 943 in which the next text block is identified in the jobspec file 550. Thereafter, the process jobspec method 633 reverts back to block 926. If there is no further text blocks to be instantiated into a text content object 389 in block 939, then the process jobspec method 633 ends.

In addition, once the current LCE object 626 (FIG. 4E) and the template name 629 (FIG. 4E) have been obtained by means of the process jobspec method 633 above, then the Do Print method 583 is called to cause the generation of an expression definition file 569 therefrom.

With reference to FIG. 4L, shown is an example of the jobspec file 550 according to an embodiment of the present invention. The jobspec file 550 includes a number of tags that identify the information contained therein. In particular, the jobspec file 550 includes a header 953 and tags that identify time creation information 956. The jobspec file 550 also includes print options 959 that are related to the particular type of printer that is to be used to print out the creative expression itself. The jobspec file 550 also includes a pair of template name tags which delineate a template name that is associated with the creative expression that is contained within the jobspec file 550. This template name identifies a specific template in the template database 559 (FIG. 4). In addition, the jobspec file 550 includes several text tags 966 that identify text blocks to be used in the creative expression. Within each pair of text tags, is a pair of region tags that identify a particular region name as well as a text string and the accompanying font specifications for the text string.

The jobspec file 550 also includes a number of pairs of image tags 969, each pair of image tags identifying the specifications for a particular image. Within the image tags 969 are region tags that identify a region name and a pair of remote tags that identify an HTTP address at which the image may be found. The jobspec file 550 includes essentially the content alone without any particular specification as to how and where the image or text block is to be printed on a particular page.

Figure 5:
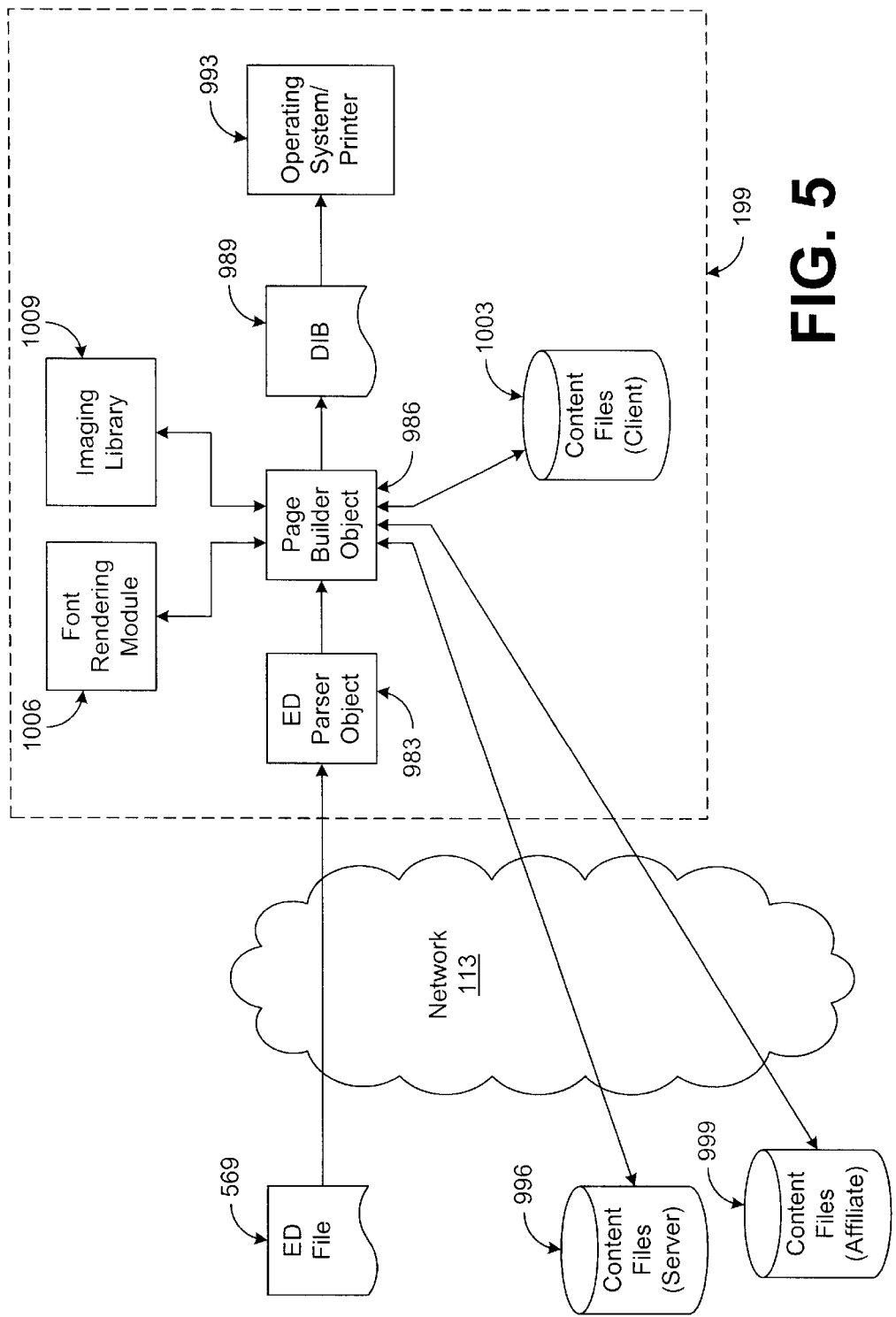
FIG. 5 is a block diagram of client print logic employed in the creative expression system of FIG. 1.

With reference to FIG. 5, shown is a block diagram of the client print logic 199 according to another embodiment of the present invention. The client print logic 199 receives the expression definition file 569 by way of the network 113. The expression definition file 569 is then processed by the ED parser object 983 that generally recreates the information contained in the OET object 563 (FIG. 4C) that was placed in the expression definition file 569 by the page layout object 566 (FIG. 4). The ED parser object 983 then instantiates a page builder object 986 that recreates the pages of the creative expression with the appropriate images and text blocks and puts them in the form of a device independent bitmap (DIB) 989 that is provided to the operating system/printer 993 of the client device 109 (FIG. 1). The page builder object 986 obtains the actual images or text that was contained in the image and text content objects 386 and 389 from either a server content file location 996 or affiliate content file location 999 by way of the network 113 (FIG. 1), or from a client content file location 1003. The server content file location 996, affiliate content file location 999, and the client file location 1003 may exist, for example, in the memories 126, 146, or 166 (FIG. 1) of the application server 103 (FIG. 1), the affiliate server 106 (FIG. 1), and the client device 109 (FIG. 1), or on any other device linked to the network 113.

Thus, the present invention provides a distinct advantage in that the actual images and text that are to be included in a particular creative expression are not downloaded across the network 113 until the last step in which the actual printing of the creative expression occurs thereby minimizing the amount of time it takes to transfer the bulk image and text data until the last steps are performed. The page builder object 986 also employs a font rendering module 1006 and an imaging library 1009 in order to create the images and text appropriately. In particular, the imaging library is used to convert various image file formats of images received from the network 113 into a file format that is recognizable by the operating system/printer 993.

Figure 5A:
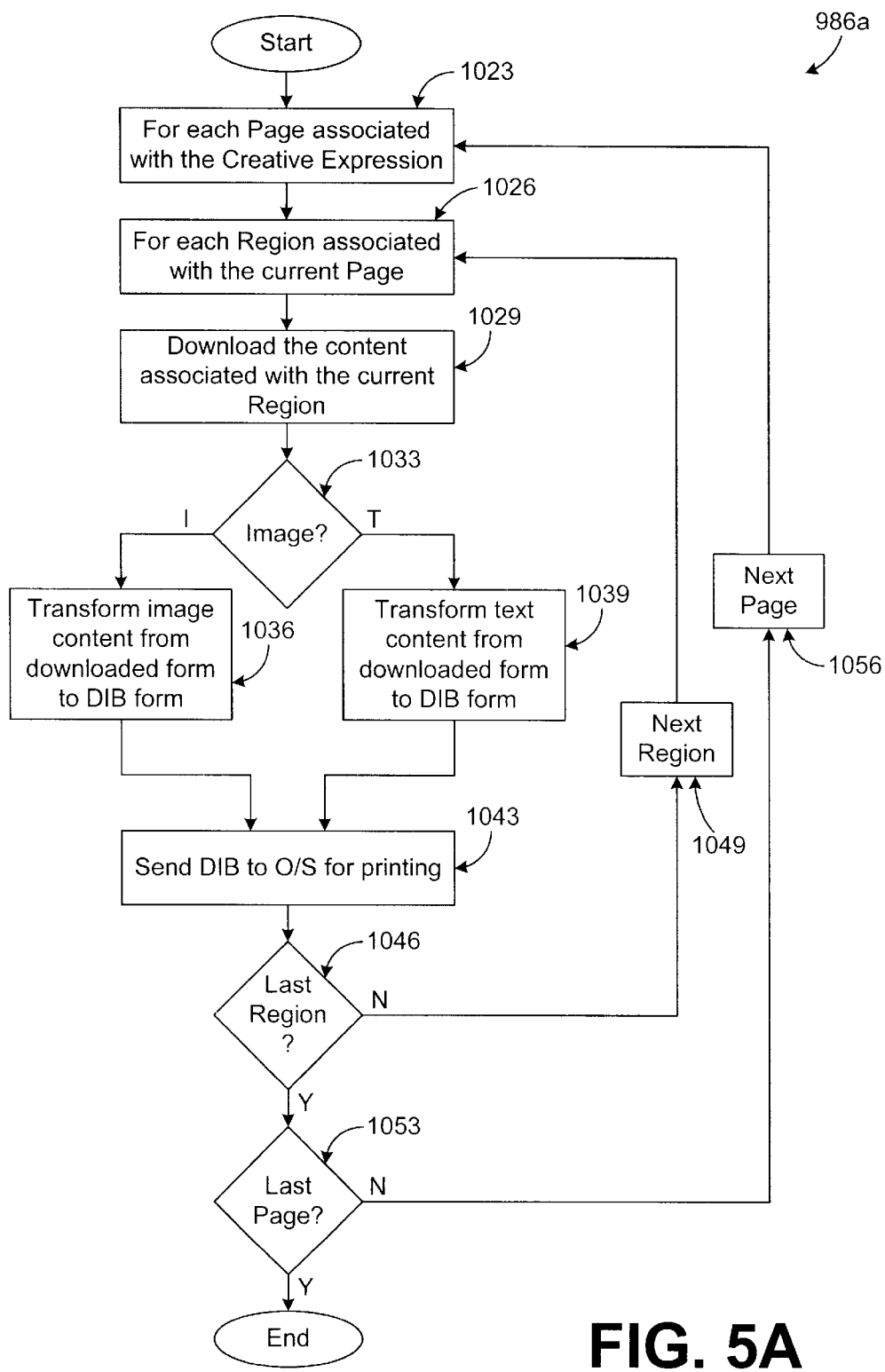
FIG. 5A is a flow chart of a build method employed in the client print logic of FIG. 5.

Turning then to FIG. 5A, shown is a build method 986a that is encapsulated within the page builder object 986 (FIG. 5). The build method 986a essentially includes the steps taken by the page builder object 986 to create the DIB files 989 that are supplied to the operating system/printer 993 to print the final creative expression. Beginning with block 1023, a loop is defined for each page associated with the creative expression. Thereafter, in block 1026, a second nested loop is defined for each region associated with the current page of the creative expression. Thereafter, in block 1029, the content that is associated with the current region is downloaded from either the server content file location 996 (FIG. 5), the affiliate content file location 999(FIG. 5), the client content file location 1003 (FIG. 5), or from some other device on the network 113 (FIG. 1). Then, in block 1033, it is determined whether the downloaded information comprises either text or an image.

If the downloaded content is an image, then the build method 986a moves to block 1036. Otherwise, the build method 986a progresses to block 1039. In block 1036, the downloaded image content is transformed into the DIB format. Otherwise, in block 1039, the downloaded text content is also transformed into DIB format. Thereafter, in block 1043, the newly created DIB file 989 is sent to the operating system 993 for printing. The operating system/printer 993 (FIG. 5) performs any necessary tasks such as scaling an image or text block to fit in a specific region, etc. This is done using the imaging library 1009 as is known by those skilled in the art.

Thereafter, in block 1046, it is determined whether the last region has been printed. If not, then the build method 986a moves to block 1049 in which the next region is identified and thereafter, the build method 986a reverts back to block 1026. Otherwise, the build method 986a progresses to block 1053 in which it is determined whether the last page of the creative expression has been printed. If not, then the build method 986a moves to block 1056 in which the next page is identified for printing and thereafter the build method reverts back to block 1023. Otherwise, the build method 986a ends appropriately.

In addition to the forgoing, the logic 193a, 193b, 196, and 199 of the present invention can be implemented in hardware, software, firmware, or a combination thereof. In the preferred embodiment(s), the logic 193a, 193b, 196, and 199 is implemented in software or firmware that is stored in a memory and that is executed by a suitable instruction execution system. If implemented in hardware, as in an alternative embodiment, the logic 193a, 193b, 196, and 199 can implemented with any or a combination of the following technologies, which are all well known in the art: a discrete logic circuit(s) having logic gates for implementing logic functions upon data signals, an application specific integrated circuit having appropriate logic gates, a programmable gate array(s) (PGA), a fully programmable gate array (FPGA), etc.

Also, the flow chart of FIGS. 3F, 4F–I, 4K, and 5A show the architecture, functionality, and operation of a possible implementation of the respective methods illustrated therein. In this regard, each block represents a module, segment, or portion of code, which comprises one or more executable instructions for implementing the specified logical function (s). It should also be noted that in some alternative implementations, the functions noted in the blocks may occur out of the order noted in FIGS. 3F, 4F–I, 4K, and 5A. For example, two blocks shown in succession in FIGS. 3F, 4F–I, 4K, and 5A may in fact be executed substantially concurrently or the blocks may sometimes be executed in the reverse order, depending upon the functionality involved, as will be further clarified hereinbelow.

The logic 193a, 193b, 196, and 199, which comprises executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A method for generating an expression definition file from which a creative expression may be printed, comprising the steps of:

receiving a logical creative expression in a processing server from an affiliate server, the logical creative expression having at least one content element and a template type;

identifying a template associated with the template type within the processing server, the template specifying at least one page with at least one region;

associating the at least one content element with the at least one region; and generating the expression definition file embodying the creative expression, the expression definition file specifying the at least one page with the at least one region and the at least one content element associated therewith for printing.

2. The method of claim 1, further comprising the step of transmitting the expression definition file from the processing server to the affiliate server for printing.

3. The method of claim 1, further comprising the step of transmitting the expression definition file from the processing server to a client device for printing.

4. The method of claim 1, wherein the step of identifying a template associated with the template type within the processing server further comprises drawing an association between the template type and a template stored in a template database.

5. The method of claim 1, wherein the step of associating the at least one content element with the at least one region further comprises the steps of:

associating a first name with the at least one content element;

associating a second name with the at least one region; and drawing an association between the first name and the second name.

6. A system for generating an expression definition file from which a creative expression may be printed, comprising:

a processing server having a processor electrically coupled to a local interface and a memory electrically coupled to the local interface, the processing server being configured to communicate with an affiliate server via a communications network; and operating logic stored on the memory and executable by the processor, the operating logic comprising:

logic to receive a logical creative expression defining the creative expression from the affiliate server, the logical creative expression having at least one content element and a template type;

logic to identify a template stored in the memory associated with the template type, the template specifying at least one page with at least one region;

logic to associate the at least one content element with the at least one region; and logic to generate the expression definition file embodying the creative expression, the expression definition file specifying the at least one page with the at least one region for printing.

7. The system of claim 6, wherein the at least one content element is an image.

8. The system of claim 6, wherein the at least one content element is a block of text.

9. The system of claim 6, wherein the at least one content element further comprises an address of the content element on the communications network.

10. The system of claim 6, wherein the operating logic further comprises logic to transmit the expression definition file from the processing server to the affiliate server for printing.

11. The system of claim 6, wherein the operating logic further comprises logic to transmit the expression definition file from the processing server to a client device via the communications network for printing.

12. The system of claim 6, wherein the operating logic further comprises logic to identify a template stored in the memory associated with the template type further comprises logic to draw an association between the template type and the template stored in a template database.

13. The system of claim 6, wherein the logic to associate the at least one content element with the at least one region further comprises:

logic to identify a first name associated with the at least one content element;

logic to identify a second name associated with the at least one region; and logic to draw an association between the first name and the second name.

14. A system for generating an expression definition file from which a creative expression may be printed, comprising:

means within a processing device for receiving a logical creative expression defining the creative expression from an affiliate device, the logical creative expression having at least one content element and a template type;

means for identifying a template stored in the memory associated with the template type, the template specifying at least one page with at least one region;

means for associating the at least one content element with the at least one region; and means for generating the expression definition file embodying the creative expression, the expression definition file specifying the at least one page with the at least one region for printing.

15. The system of claim 14, wherein the at least one content element is an image.

16. The system of claim 14, wherein the at least one content element is a block of text.

17. The system of claim 14, wherein the at least one content element further comprises an address of the content element on the communications network.

18. The system of claim 14, further comprising means for transmitting the expression definition file from the processing device to the affiliate device for printing.

19. The system of claim 14, further comprising means for transmitting the expression definition file from the processing server to a client device via the communications network for printing.

20. A method for generating an expression definition file from which a creative expression may be printed, comprising the steps of:

generating a logical creative expression in a processing server based upon a selection input received from a client device via a communications network, the logical creative expression having a template type and at least one content element;

identifying a template associated with the template type, the template specifying at least one page with at least one region;

associating the at least one content element with the at least one region; and generating the expression definition file embodying the creative expression, the expression definition file specifying the at least one page with the at least one region for printing.

21. The method of claim 20, wherein the step of generating a logical creative expression in a processing server based upon a selection input received from a client device via a communications network, further comprises the steps of:

generating a number of graphical user interfaces that facilitate the generation of a selection input in the client device;

transmitting the graphical user interfaces to the client device; and receiving the selection input comprising the template type and the at least one content element of the creative expression from the client device.

22. The method of claim 20, further comprising the step of transmitting the expression definition file from the processing server to the client device for printing.

23. The method of claim 20, wherein the step of identifying a template associated with the template type further comprises drawing an association between the template type and a template stored in a template database.

24. The method of claim 20, wherein the step of associating the at least one content element with the at least one region further comprises the steps of:

associating a first name with the at least one content element;

associating a second name with the at least one region; and drawing an association between the first name and the second name.

25. A system for generating an expression definition file from which a creative expression may be printed, comprising:

a processing server having a processor electrically coupled to a local interface and a memory electrically coupled to the local interface, the processing server being configured to communicate with a client device via a communications network; and operating logic stored on the memory and executable by the processor, the operating logic comprising:

logic to generate a logical creative expression based upon a selection input received from the client device via the communications network, the logical creative expression having a template type and at least one content element;

logic to identify a template associated with the template type, the template specifying at least one page with at least one region;

logic to associate the at least one content element with the at least one region; and logic to generate the expression definition file embodying the creative expression, the expression definition file specifying the at least one page with the at least one region for printing.

26. The system of claim 25, wherein the at least one content element is an image.

27. The system of claim 25, wherein the at least one content element is a block of text.

28. The system of claim 25, wherein the at least one content element further comprises an address of the content element on the communications network.

29. The system of claim 25, wherein the logic to generate a logical creative expression based upon a selection input received from the client device via the communications network further comprises:

logic to generate a number of graphical user interfaces that facilitate the generation of a selection input in the client device;

logic to transmit the graphical user interfaces to the client device; and logic to receive the selection input from the client device comprising the template type and the at least one content element of the creative expression.

30. The system of claim 25, wherein the operating logic further comprises logic to transmit the expression definition file from the processing server to the client device for printing.

31. The system of claim 25, wherein the logic to identify a template associated with the template type further comprises logic to associate the template type with a template stored in a template database in the processing server.

32. The system of claim 25, wherein logic to associate the at least one content element with the at least one region further comprises:

logic to identify a first name associated with the at least one content element;

logic to identify a second name associated with the at least one region; and logic to draw an association between the first name and the second name.

33. A system for generating an expression definition file from which a creative expression may be printed, comprising:

means for generating a logical creative expression based upon a selection input received from a client device via a communications network, the logical creative expression having a template type and at least one content element;

means for identifying a template associated with the template type, the template specifying at least one page with at least one region;

means for associating the at least one content element with the at least one region; and means for generating the expression definition file embodying the creative expression, the expression definition file specifying the at least one page with the at least one region for printing.

34. The system of claim 33, wherein the means for generating a logical creative expression based upon a selection input received from a client device via a communications network further comprises:

means for generating a number of graphical user interfaces that facilitate the generation of a selection input in the client device;

means for transmitting the graphical user interfaces to the client device; and means for receiving the selection input from the client device comprising the template type and the at least one content element of the creative expression.

35. The system of claim 33, further comprising means for transmitting the expression definition file from the processing device to the client device for printing.

* * * * *